US008956766B2

(12) United States Patent
Nishimoto

(10) Patent No.: US 8,956,766 B2
(45) Date of Patent: Feb. 17, 2015

(54) NON-AQUEOUS ELECTROLYTE BATTERY, METHOD OF MANUFACTURING NON-AQUEOUS ELECTROLYTE BATTERY, INSULATING MATERIAL, METHOD OF MANUFACTURING INSULATING MATERIAL, BATTERY PACK, ELECTRONIC DEVICE, ELECTROMOTIVE VEHICLE, POWER STORAGE APPARATUS, AND ELECTRIC POWER SYSTEM

(75) Inventor: Atsushi Nishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 13/303,798

(22) Filed: Nov. 23, 2011

(65) Prior Publication Data

US 2013/0054061 A1 Feb. 28, 2013

(30) Foreign Application Priority Data

Aug. 30, 2011 (JP) ................. 2011-187781

(51) Int. Cl.
*H01M 2/16* (2006.01)
*H01M 10/04* (2006.01)
*H01M 10/052* (2010.01)
*H01M 10/0565* (2010.01)
*H01M 10/058* (2010.01)

(52) U.S. Cl.
CPC ............ *H01M 2/1653* (2013.01); *H01M 2/166* (2013.01); *H01M 2/1686* (2013.01); *H01M 10/0413* (2013.01); *H01M 10/052* (2013.01); *H01M 10/0565* (2013.01); *H01M 10/058* (2013.01); *H01M 2220/20* (2013.01); *H01M 2300/0085* (2013.01); *Y02E 60/122* (2013.01); *Y02T 10/7011* (2013.01)
USPC .......................................... 429/246

(58) Field of Classification Search
None
See application file for complete search history.

(56) References Cited

U.S. PATENT DOCUMENTS

| 6,159,638 | A | * | 12/2000 | Takatera et al. ............... 429/309 |
|---|---|---|---|---|
| 2003/0017386 | A1 | * | 1/2003 | Daido et al. .................. 429/142 |
| 2004/0053122 | A1 | * | 3/2004 | Sugiyama et al. ............ 429/144 |
| 2008/0090142 | A1 | * | 4/2008 | Shibuya ........................ 429/163 |
| 2008/0280197 | A1 | * | 11/2008 | Machida ....................... 429/129 |
| 2010/0285349 | A1 | * | 11/2010 | Goto et al. .................... 429/156 |
| 2011/0293976 | A1 | * | 12/2011 | Chiba et al. .................... 429/94 |
| 2013/0011716 | A1 | * | 1/2013 | Sano et al. .................... 429/145 |

FOREIGN PATENT DOCUMENTS

JP 2003-123726 4/2003

* cited by examiner

*Primary Examiner* — Patrick Ryan
*Assistant Examiner* — Jose Colucci Rios
(74) *Attorney, Agent, or Firm* — K&L Gates LLP

(57) ABSTRACT

A non-aqueous electrolyte battery has a positive electrode, a negative electrode, an insulating layer present between the positive electrode and the negative electrode, and an electrolytic solution holding layer that composes the insulating layer and includes an electrolytic solution and a porous polymer compound, in which the electrolytic solution is held in the pores in the porous polymer compound and swells the porous polymer compound, the material of the porous polymer compound includes a vinylidene fluoride polymer, the vinylidene fluoride polymer is a vinylidene fluoride homopolymer or a copolymer including a vinylidene fluoride monomer unit and a hexafluoropropylene monomer unit, the mass composition ratio of the monomer units of the vinylidene fluoride polymer, or vinylidene fluoride monomer units:hexafluoropropylene monomer units, is 100:0 to 95:5, and the weight average molecular weight of the vinylidene fluoride polymer is 500,000 or more to less than 1.5 million.

19 Claims, 18 Drawing Sheets

NON-AQUEOUS ELECTROLYTE BATTERY, METHOD OF MANUFACTURING NON-AQUEOUS ELECTROLYTE BATTERY, INSULATING MATERIAL, METHOD OF MANUFACTURING INSULATING MATERIAL, BATTERY PACK, ELECTRONIC DEVICE, ELECTROMOTIVE VEHICLE, POWER STORAGE APPARATUS, AND ELECTRIC POWER SYSTEM

CROSS REFERENCES TO RELATED APPLICATIONS

The present application claims priority to Japanese Patent Application No. 2011-187781 filed on Aug. 30, 2011, and contains subject matter related to Japanese Patent Application No. 2010-192227 filed on Aug. 30, 3010, the disclosures of which are incorporated herein by reference.

BACKGROUND

The present technology relates to a non-aqueous electrolyte battery, a method of manufacturing the non-aqueous electrolyte battery, an insulating material, a method of manufacturing the insulating material, a battery pack, an electronic device, an electromotive vehicle, a power storage apparatus, and an electric power system. More specifically, the technology relates to a non-aqueous electrolyte battery having a porous polymer compound holding an electrolytic solution, a method of manufacturing the non-aqueous electrolyte battery, an insulating material, a method of manufacturing the insulating material, a battery pack, an electronic device, an electromotive vehicle, a power storage apparatus, and an electric power system.

A lithium ion secondary battery generally has a configuration in which carbon, a lithium-transition metal complex oxide, and a mixture of carbonate esters are used for the negative electrode, the positive electrode, and an electrolytic solution, respectively. Since carbonate ester used for the electrolytic solution is not easily oxidized or reduced by water or other organic solvents, and can obtain a higher voltage, the lithium ion secondary battery has a higher energy density and a higher capacity than a nickel-hydrogen battery, which is an aqueous battery. Therefore, the lithium ion secondary battery is widely distributed as a secondary battery for notebook-type personal computers, mobile phones, video cameras, and digital still cameras.

Since a laminate-type lithium ion secondary battery in which a laminate film, such as an aluminum laminate film, is used for an exterior has a light weight and a large energy density, which results from a large fraction of an active material in the battery, the laminate-type lithium ion secondary battery is widely used.

Since the laminate-type lithium ion secondary battery has a weaker strength than a battery covered with a metal can, the voltage applied to a battery element becomes weak. Therefore, when the electrode is expanded and shrunk due to repetition of charging and discharging of the battery, there is a problem in that the inter-electrode distance between the positive electrode and the negative electrode becomes uneven due to the above fact, and thus the ion conductivity and the electric current density become uneven, whereby the capacity is degraded.

With respect to this problem, a technology in which the inter-electrode distance is kept constant by providing a resin having an adhering force between the positive electrode and the negative electrode, and degradation of the capacity due to repetition of charging and discharging is suppressed has been suggested.

For example, Japanese Patent No. 4099969 describes a battery in which a porous resin is formed on the surface of an electrode by floating a porous endothermic insulating resin in the electrode on the surface of the electrode by spinodal decomposition or a micelle method.

SUMMARY

However, in a battery having a configuration in which a porous resin manufactured using spinodal decomposition is disposed between the electrodes, a polymer material having the optimal material kind and composition should be used as a material of the porous resin. That is, when a polymer material having the optimal material kind and composition is not used as a material of the porous resin, since the optimal porosity is not obtained, the ion conductivity is degraded, and battery characteristics are degraded. In addition, since the adhesiveness between the electrodes is degraded, and the inter-electrode distance becomes uneven due to repetition of charging and discharging, the capacity is degraded due to repetition of charging and discharging.

Therefore, it is desirable to provide a non-aqueous electrolyte battery in which degradation of the ion conductivity can be suppressed, and degradation of the capacity due to repetition of charging and discharging can be suppressed, a method of manufacturing the non-aqueous electrolyte battery, an insulating material, a method of manufacturing the insulating material, a battery pack, an electronic device, an electromotive vehicle, a power storage apparatus, and an electric power system.

According to the technology, there is provided a non-aqueous electrolyte battery having a positive electrode, a negative electrode, an insulating layer present between the positive electrode and the negative electrode, and an electrolytic solution holding layer that composes the insulating layer and includes an electrolytic solution and a porous polymer compound, in which the electrolytic solution is held in the pores in the porous polymer compound and swells the porous polymer compound, the material of the porous polymer compound includes a vinylidene fluoride polymer, the vinylidene fluoride polymer is a vinylidene fluoride homopolymer or a copolymer including a vinylidene fluoride monomer unit and a hexafluoropropylene monomer unit, the mass composition ratio of the monomer units of the vinylidene fluoride polymer, or vinylidene fluoride monomer units:hexafluoropropylene monomer units, is 100:0 to 95:5, and the weight average molecular weight of the vinylidene fluoride polymer is 500,000 or more to less than 1.5 million.

The technology is a method of manufacturing a non-aqueous electrolyte battery in which a polymer material includes a vinylidene fluoride polymer, the vinylidene fluoride polymer is a vinylidene fluoride homopolymer or a copolymer including a vinylidene fluoride monomer unit and a hexafluoropropylene monomer unit, the mass composition ratio of the monomer units of the vinylidene fluoride polymer, or vinylidene fluoride monomer units:hexafluoropropylene monomer units, is 100:0 to 95:5, and the weight average molecular weight of the vinylidene fluoride polymer is 500,000 or more to less than 1.5 million, having a process in which a solution containing the polymer material dissolved in a first solvent composed of a polar organic solvent is coated on a porous base material, the coated porous base material is immersed in a second solvent, which is compatible with the first solvent and is a poor solvent with respect to the polymer material, thereby forming a porous polymer compound on the porous base material; a process in which an electrode body having a positive electrode, a negative electrode, and the porous base material on which the porous polymer compound is formed, in which the porous base material is present between the positive electrode and the negative electrode, is manufactured; and a process in which the electrode body is accommodated in an exterior body, an electrolytic solution is injected into the exterior body, and then heat pressing is carried out.

The technology is an insulating material including a porous polymer compound, in which the porous polymer compound can hold an electrolytic solution in the pores, and can be swollen by the electrolytic solution, the material of the porous polymer compound includes a vinylidene fluoride polymer, the vinylidene fluoride polymer is a vinylidene fluoride homopolymer or a copolymer including a vinylidene fluoride monomer unit and a hexafluoropropylene monomer unit, the mass composition ratio of the monomer units of the vinylidene fluoride polymer, or vinylidene fluoride monomer units:hexafluoropropylene monomer units, is 100:0 to 95:5, and the weight average molecular weight of the vinylidene fluoride polymer is 500,000 or more to less than 1.5 million.

The technology is a method of manufacturing an insulating material including a porous polymer compound, having a process in which a solution containing a polymer material dissolved in a first solvent composed of a polar organic solvent is coated on a base material, the base material coated with the solution is immersed in a second solvent, which is compatible with the first solvent and is a poor solvent with respect to the polymer material, thereby forming the porous polymer compound, in which the polymer material includes a vinylidene fluoride polymer, the vinylidene fluoride polymer is a vinylidene fluoride homopolymer or a copolymer including a vinylidene fluoride monomer unit and a hexafluoropropylene monomer unit, the mass composition ratio of the monomer units of the vinylidene fluoride polymer, or vinylidene fluoride monomer units:hexafluoropropylene monomer units, is 100:0 to 95:5, and the weight average molecular weight of the vinylidene fluoride polymer is 500,000 or more to less than 1.5 million.

The battery pack, the electronic device, the electromotive vehicle, the power storage apparatus, and the electric power system of the technology have the above non-aqueous electrolyte battery.

In the technology, a vinylidene fluoride polymer having a mass composition ratio, or vinylidene fluoride monomer units:hexafluoropropylene monomer units, of 100:0 to 95:5, and a weight average molecular weight of 500,000 or more to less than 1.5 million is used as the material of the porous polymer compound. Thereby, favorable ion conductivity, and favorable adhesiveness between the positive electrode and the negative electrode can be obtained.

According to the technology, degradation of the ion conductivity can be suppressed, and degradation of the capacity due to repetition of charging and discharging can be suppressed.

Additional features and advantages are described herein, and will be apparent from the following Detailed Description and the figures.

DETAILED DESCRIPTION

Embodiments of the present application will be described below in detail with reference to the drawings.

Hereinafter, the embodiments of the present technology will be described with reference to the drawings. Meanwhile, the description will be made in the following order.

1. A first embodiment (a first example of the non-aqueous electrolyte battery)
2. A second embodiment (a second example of the non-aqueous electrolyte battery)
3. A third embodiment (a third example of the non-aqueous electrolyte battery)
4. A fourth embodiment (an example of a battery pack in which the non-aqueous electrolyte battery is used)
5. A fifth embodiment (an example of an electric storage system and the like in which the non-aqueous electrolyte battery is used)
6. Other embodiment (an example of variation)

1. First Embodiment (Configuration of the Non-Aqueous Electrolyte Battery)

Figure 1:
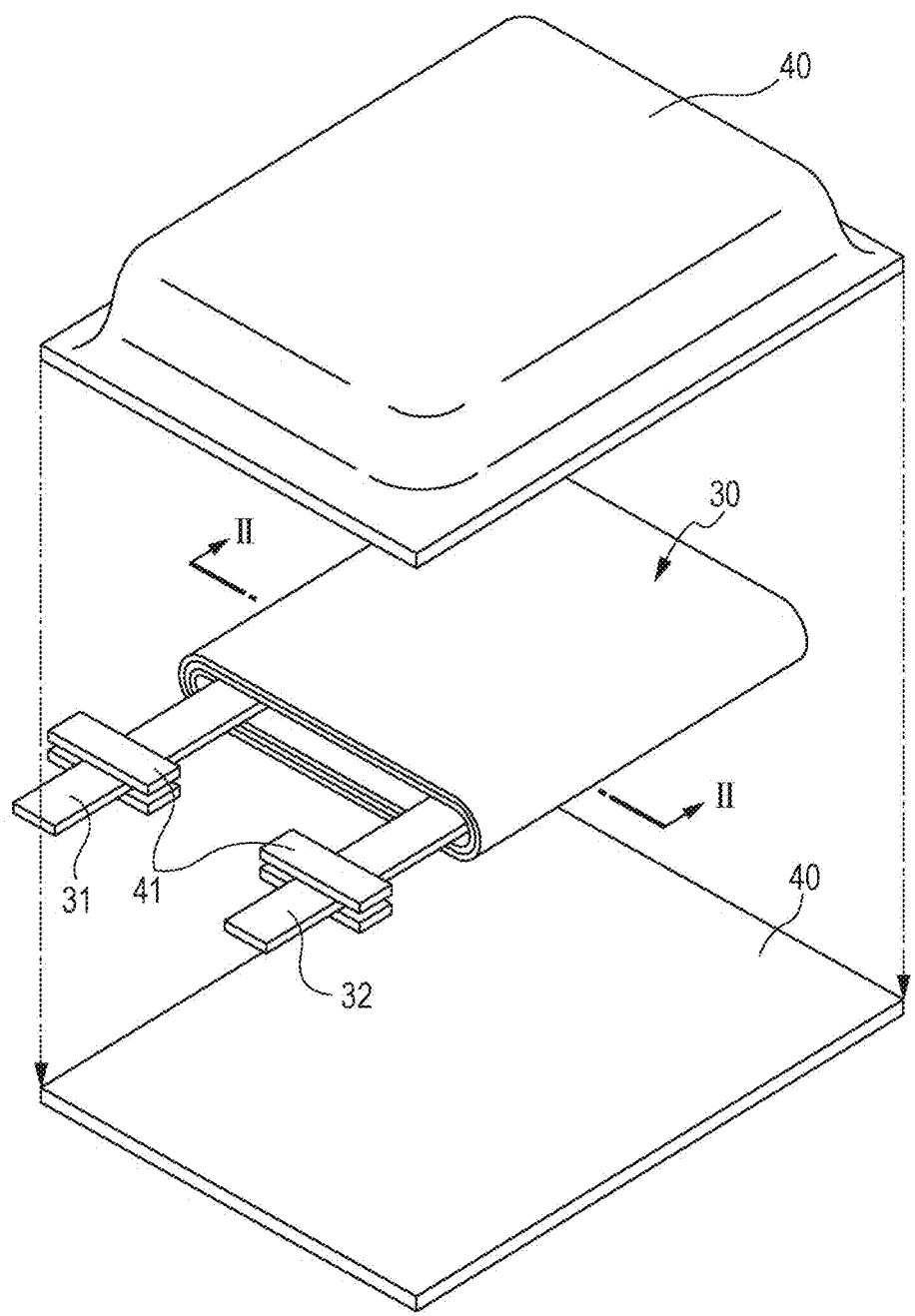
FIG. 1 is an exploded perspective view showing an example of the configuration of the non-aqueous electrolyte battery according to the embodiment of the technology.
Figure 2:
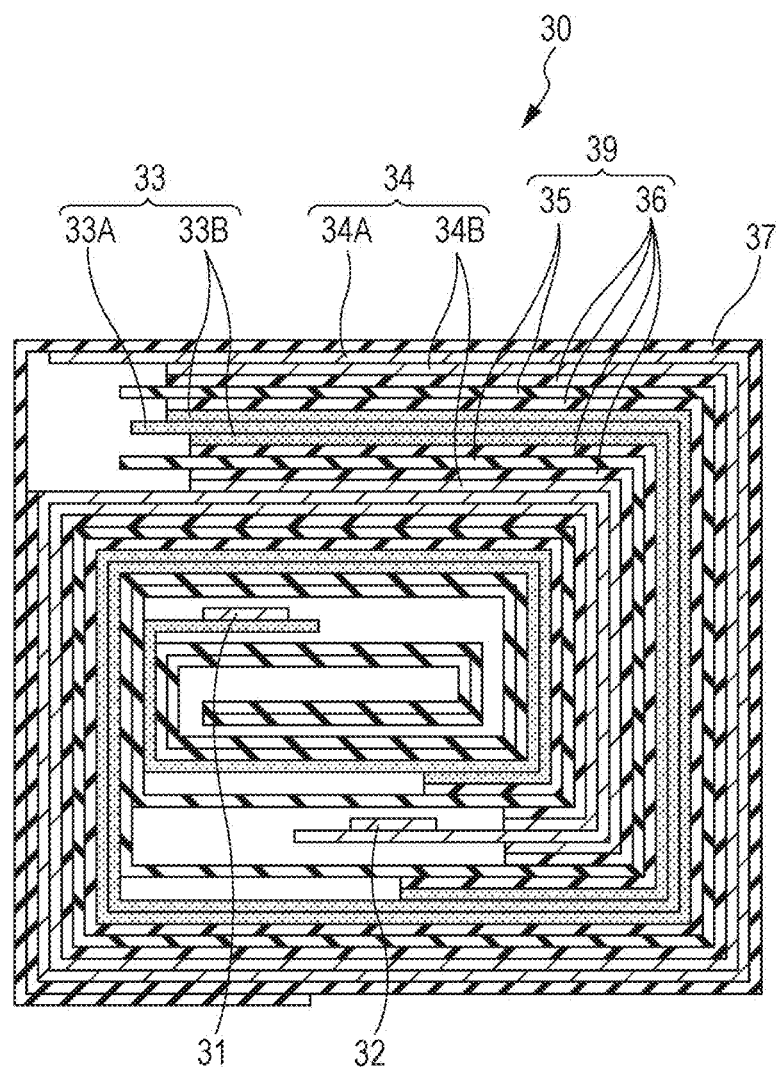
FIG. 2 is a cross-section view of a wound electrode body taken along the line I-I in FIG. 1.

The non-aqueous electrolyte battery according to the first embodiment of the technology will be described. FIG. 1 shows the exploded perspective configuration of the non-aqueous electrolyte battery according to the first embodiment. FIG. 2 shows the enlarged cross-section of a wound electrode body 30, which is taken along the line I-I in FIG. 1.

The non-aqueous electrolyte battery mainly accommodates the wound electrode body 30, to which a positive electrode lead 31 and a negative electrode lead 32 are attached, in a film-shaped exterior member 40. This battery structure in which the film-shaped exterior member 40 is used is called a laminate film type.

The positive electrode 31 and the negative electrode 32 are drawn out in the same direction, for example, from the inside of the exterior member 40 to the outside. The positive electrode lead 31 is composed of, for example, a metallic material, such as aluminum, and the negative electrode lead 32 is composed of, for example, a metallic material, such as copper, nickel, and stainless steel. These metallic materials have, for example, a thin plate shape or a netlike shape.

The exterior member 40 is composed of an aluminum laminate film in which a nylon film, an aluminum foil, and a polyethylene film are bonded in this order. The exterior member 40 has a configuration in which, for example, two sheets of rectangular aluminum laminate films are thermally fused or mutually adhered using an adhesive at the outer circumferential portions so that the polyethylene film surfaces the wound electrode body 30.

Adhering films 41 are inserted between the exterior member 40 and the positive electrode 31 and the negative electrode 32 in order to prevent intrusion of external air. The adhering film 41 is composed of a material having adhesiveness with respect to the positive electrode lead 31 and the negative electrode lead 32. Examples of such a material include polyolefin resins, such as polyethylene, polypropylene, modified polyethylene, and modified polypropylene.

Meanwhile, instead of the aluminum laminate film, the exterior member 40 may be composed of a laminate film having another laminate structure, or may be composed of a polymer film, such as polypropylene, and a metal film.

FIG. 2 shows the cross-sectional configuration of the wound electrode body 30 taken along the line I-I in FIG. 1. The wound electrode body 30 has a positive electrode 33 and a negative electrode 34 laminated and wound through an insulating layer 39, which is composed of a separator 35 and an electrolytic solution holding layer 36, and the outermost circumferential portion is protected with a protective tape 37. In the wound electrode body 30, the electrolytic solution holding layer 36 is formed on both surfaces of the separator 35, and the separator 35 and the positive electrode 33, and the separator 35 and the negative electrode 34 are adhered through the electrolytic solution holding layer 36, respectively. In addition, the positive electrode 33 and the negative electrode 34 are adhered through the insulating layer 39. Provision of the insulating layer 39 between the positive electrode 33 and the negative electrode 34 increases the adhesiveness between the positive electrode 33 and the negative electrode 34 so as to suppress the inter-electrode distance from becoming uneven due to repetition of charging and discharging. Meanwhile, the electrolytic solution holding layer 36 may be formed on only one surface of the separator 35.

(Positive Electrode)

The positive electrode 33, for example, has positive electrode active material layers 33B provided at both surfaces of a positive electrode collector 33A having a pair of surfaces. However, the positive electrode active material layer 33B may be provided on only one surface of the positive electrode collector 33A.

The positive electrode collector 33A is composed of, for example, a metallic material, such as aluminum, nickel, and stainless steel.

The positive electrode active material layer 33B includes one or two or more positive electrode materials that can absorb and discharge lithium as a positive electrode active material, and may include other materials, such as a bonding agent and a conducting agent, according to necessity.

(Positive Electrode Material)

Appropriate examples of the positive electrode materials that can absorb and discharge lithium include lithium oxides, lithium phosphate, lithium sulfate, and lithium-containing compounds, such as interlayer compounds and the like including lithium, and the materials may be used in combination of two or more kinds Lithium-containing compounds including lithium, transition metal elements, and oxygen (O) are preferred to increase the energy density. Examples of the lithium-containing compounds include lithium complex oxides having a bedded salt-type structure represented by the following formula (1), lithium complex phosphates having an olivine-type structure represented by the following formula (2), and the like. The lithium-containing compounds preferably include at least one from a group composed of cobalt (Co), nickel (Ni), manganese (Mn), and iron (Fe) as the transition metal elements. Examples of the lithium-containing compounds lithium complex oxides having a bedded salt-type structure represented by the following formula (3), (4), or (5), lithium complex oxides having a spinel-type structure represented by the following formula (6), lithium complex phosphate having an olivine-type structure represented by the following formula (7), and the like. Specific preferred examples include lithium complex oxides, such as lithium cobaltate, lithium nickelate, and solid solutions thereof {Li(Ni$_x$Co$_y$Mn$_z$)O$_2$ (the values of x, y, and z are 0<x<1, 0<y<1, 0≤z<1, and x+y+z=1), Li(Ni$_x$Co$_y$Al$_z$)O$_2$ (the values of x, y, and z are 0<x<1, 0<y<1, 0≤z<1, and x+y+z=1), and the like}, and manganese spinel (LiMn$_2$O$_4$) and solid solutions thereof {Li(Mn$_{2-v}$Ni$_v$)O$_4$ (the values of v is v<2)}, and phosphate compounds having an olivine structure, such as lithium iron phosphate (LiFePO$_4$), Li$_x$Fe$_{1-y}$M2$_y$PO$_4$ (in the formula, "M2" represents at least one from a group composed of manganese (Mn), nickel (Ni), cobalt (Co), zinc (Zn), and magnesium (Mg). "x" is a value in a range of 0.9≤x≤1.1.). This is because a high energy density can be obtained.

$$Li_pNi_{(1-q-r)}Mn_qM1_rO_{(2-y)}X_z \quad (1)$$

(in the formula, "M1" represents at least one of elements selected from Groups 2 to 15 excluding nickel (Ni) and manganese (Mn). "x" represents at least one of Group 16 elements and Group 17 elements other than oxygen (O). "p", "q", "y" and "z" are values in ranges of 0≤p≤1.5, 0≤q≤1.0, 0≤r≤1.0, −0.10≤y≤0.20, and 0≤z≤0.2.).

$$Li_aM2_bPO_4 \quad (2)$$

(in the formula, "M2" represents at least one of elements selected from Groups 2 to 15. "a" and "b" are values in ranges of 0≤a≤2.0 and 0.5≤b≤2.0.)

$$Li_jMn_{(1-g-h)}Ni_gM3_hO_{(2-j)}F_k \quad (3)$$

(in the formula, "M3" represents at least one from a group composed of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W). "f", "g", "h", "j", and "k" are values in ranges of 0.8≤f≤1.2, 0≤g≤0.5, 0≤h≤0.5, g+h≤1, −0.1≤j≤0.2, and 0≤k≤0.1. Meanwhile, the composition of lithium varies with the charging and discharging state, and the value of "f" represents a value in a fully discharged state.)

$$Li_mNi_{(1-n)}M4_nO_{(2-p)}F_q \quad (4)$$

(in the formula, "M4" represents at least one from a group composed of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W). "m", "n", "p", and "q" are values in ranges of 0.8≤m≤1.2, 0.005≤n≤0.5, −0.1≤p≤0.2, and 0≤q≤0.1. Meanwhile, the composition of lithium varies with the charging and discharging state, and the value of "m" represents a value in a fully discharged state.)

$$Li_rCo_{(1-s)}M5_sO_{(2-t)}F_u \quad (5)$$

(in the formula, "M5" represents at least one from a group composed of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). "r", "s", "t", and "u" are values in ranges of 0.8≤r≤1.2, 0≤s≤0.5, −0.1≤t≤0.2, and 0≤u≤0.1. Meanwhile, the composition of lithium varies with the charging and discharging state, and the value of "r" represents a value in a fully discharged state.)

$$Li_vMn_{2-w}M6_wO_xF_y \quad (6)$$

(in the formula, "M6" represents at least one from a group composed of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). "v", "w", "x", and "y" are values in ranges of 0.9≤v≤1.1, 0≤w≤0.6, 3.7≤x≤4.1, and 0≤y≤0.1. Meanwhile, the composition of lithium varies with the charging and discharging state, and the value of "v" represents a value in a fully discharged state.)

$$Li_zM7PO_4 \quad (7)$$

(in the formula, "M7" represents at least one from a group composed of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). "z" is a value in a range of 0.9≤z≤1.1. Meanwhile, the composition of lithium varies with the charging and discharging state, and the value of "z" represents a value in a fully discharged state.) In addition, examples of the positive electrode materials that can absorb and discharge lithium also include oxides, such as titanium oxides, vanadium oxide, and manganese dioxide; disulfides, such as iron disulfide, titanium disulfide, and molybdenum sulfide; conductive polymers, such as sulfur, polyaniline, and polythiophene; and the like.

Clearly, the positive electrode materials that can absorb and discharge lithium may be materials other than the exemplified materials.

Examples of the bonding agent include synthetic rubber, such as styrene butadiene-based rubber, fluorine-based rubber, and ethylene propylene diene; and polymer materials, such as polyvinylidene fluoride. These materials may be used singly or in combination of a plurality of kinds Among them, polyvinylidene fluoride is preferred.

Examples of the conducting agent include carbon materials, such as graphite and carbon black. These materials may be used singly or in combination of a plurality of kinds (Negative Electrode)

The negative electrode 34, for example, has negative electrode active material layers 34B provided at both surfaces of a negative electrode collector 34A having a pair of surfaces. However, the negative electrode active material layer 34B may be provided on only one surface of the negative electrode collector 34A.

The negative electrode collector 34A is composed of, for example, a metallic material, such as copper, nickel, and stainless steel.

The negative electrode active material layer 34B includes one or two or more negative electrode materials that can absorb and discharge lithium as a negative electrode active material, and may include other materials, such as a bonding agent and a conducting agent, according to necessity. Meanwhile, the same bonding agent and conducting agent as described in the positive electrode section respectively can be used as the bonding agent and the conducting agent.

The negative electrode materials that can absorb and discharge lithium are, for example, carbon materials. Examples of the carbon materials include easily-graphitizable carbon, non-graphitizable carbon in which the plane separation of the (002) plane is 0.37 nm or more, graphite in which the plane separation of the (002) plane is 0.34 nm or less, and the like. More specific examples include pyrolytic carbon, cokes, glass-shaped carbon fibers, fired organic polymer compounds, activated charcoal, carbon blacks, and the like. Among them, the cokes include pitch coke, needle coke, petroleum coke, and the like. The fired organic polymer compound refers to a phenol resin, a furan resin, and the like which are fired at an appropriate temperature so as to be carbonized. Carbon materials are preferred since the change of the crystal structure according to absorption and discharging of lithium is extremely small, and therefore a high energy density is obtained, and excellent cycle characteristics are obtained, and, furthermore, carbon materials act as a conducting agent. Meanwhile, the forms of carbon materials may be fibrous, spherical, granular, and scale-like.

Examples of the negative electrode materials that can absorb and discharge lithium other than the above carbon materials include materials that can absorb and discharge lithium, and have at least one of metal elements and semimetal elements as a constituent element. This is because a high energy density can be obtained. Such negative electrode materials may be a single body, alloy, or compound of metal elements or semimetal elements, or may be a substance having the phases of one or two or more of metal elements or semimetal elements at least at some parts. Meanwhile, the "alloy" in the technology includes not only substances composed of two or more of metal components but also substances including one or more of metal elements and one or more of semimetal elements. In addition, the "alloy" may also include nonmetal elements. In the structure of the alloy, sometimes, solid solutions, eutectic (eutectic mixtures), intermetallic compounds, or two or more kinds thereof may coexist.

Examples of the metal elements or semimetal elements include metal elements or semimetal elements that can form alloys with lithium. Specific examples include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), and the like. Among them, at least one of silicon and tin is preferred, and silicon is more preferred. This is because the ability of absorbing and discharging lithium is large, and therefore a high energy density can be obtained.

Examples of the negative electrode materials having at least one of silicon and tin include a single body, alloys, or compounds of silicon, a single body, alloys, or compounds of tin, and materials having the phases of one or two or more of silicon and tin at least at some parts.

Examples of silicon alloys include alloys including, in addition to silicon, at least one from a group composed of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr) as the second constituent element. Examples of tin alloys include alloys including, in addition to tin (Sn), at least one from a group composed of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr) as the second constituent element.

Examples of tin compounds or silicon compounds include compounds including oxygen (O) or carbon (C), and may also include, in addition to tin (Sn) or silicon (Si), the above second constituent element.

Particularly, preferable examples of the negative electrode materials including at least one of silicon (Si) and tin (Sn) include materials including tin (Sn) as the first constituent element and, in addition to the tin, the second constituent element and the third constituent element. Clearly, these negative electrode materials may be used together with the above negative electrode materials. The second constituent element is at least one from a group composed of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi) and silicon (Si). The third constituent element is at least one from a group composed of boron (B), carbon (C), aluminum (Al), and phosphorous (P). This is because inclusion of the second constituent element and the third constituent element improves the cycle characteristics.

Among them, CoSnC-containing materials including tin (Sn), cobalt (Co), and carbon (C) as the constituent elements, in which the content of carbon (C) is in a range of 9.9% by mass or more to 29.7% by mass or less, and the ratio of cobalt (Co) to the sum of tin (Sn) and cobalt (Co) (Co/(Sn+Co)) is in a range of 30% by mass or more to 70% by mass or less, are preferred. This is because, in these composition ranges, a high energy density can be obtained, and excellent cycle characteristics can be obtained.

The SnCoC-containing materials may further include other constituent elements according to necessity. Preferable examples of the other constituent elements include silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), bismuth (Bi), and the like, and the SnCoC-containing materials may include two or more of them. This is because the capacity characteristics or cycle characteristics are further improved.

Meanwhile, the SnCoC-containing materials have a phase including tin (Sn), cobalt (Co), and carbon (C), and the phase preferably has a low crystallinity or amorphous structure. In addition, in the SnCoC-containing materials, it is preferable that at least some of carbon, which is a constituent element, bonds with a metal element or a semimetal element, which is another constituent element. This is because, although degradation of the cycle characteristics is considered to be caused by agglomeration or crystallization of tin (Sn) and the like, bonding of carbon with other elements suppresses the agglomeration or crystallization.

Examples of a measuring method by which the bonding state of the elements is investigated include X-ray photoelectron spectroscopy (XPS) and the like. In XPS, a carbon 1s (C1s) peak appears at 284.5 eV for graphite in an apparatus that is energy-calibrated so that a gold atom 4f (Au4f) peak is obtained at 84.0 eV. In addition, the carbon 1s peak appears at 284.8 eV for surface-contaminated carbon. In contrast to this, when the charge density of carbon element is increased, for example, when carbon is bonded with a metal element or semimetal element, the C1s peak appears in a range lower than 284.5 eV. That is, when the peak of the synthetic wave of C1s obtained for the SnCoC-containing material appears in a range lower than 284.5 eV, at least some of the carbon included in the SnCoC-containing material is bonded with a metal element or semimetal element, which is the other component element.

Meanwhile, in XPS measurement, for example, the C1s peak is used for the correction of the energy axis of a spectrum. In general, since surface-contaminated carbon is present on the surface, the C1s peak of the surface-contaminated carbon is set to 284.8 eV, which is used as the energy criterion. In XPS measurement, since the waveform of the C1s peak is obtained as a form including the peak of the surface-contaminated carbon and the peak of carbon in the SnCoC-containing material, the peak of the surface-contaminated carbon and the peak of carbon in the SnCoC-containing material are separated by an analysis using, for example, commercially available software. In waveform analyses, the location of the main peak present in the minimum bonding energy side is used as the energy criterion (284.8 eV).

In addition, examples of the negative electrode materials that can absorb and discharge lithium also include metal oxides, polymer oxides, and the like that can absorb and discharge lithium. Examples of the metal oxides include iron oxide, ruthenium oxide, molybdenum oxide, and the like, and examples of the polymer oxides include polyacetylene, polyaniline, polypyrrole, and the like.

Furthermore, the negative electrode materials that can absorb and discharge lithium may also be materials including elements that form complex oxides with lithium, such as titanium.

Clearly, metallic lithium may be used, precipitated, and dissolved as the negative electrode active material. It is also possible to precipitate and dissolve magnesium or aluminum other than lithium.

The negative electrode active material layer 34B may be formed by any of, for example, a gas phase method, a liquid phase method, flame gunning, a firing method, and coating, or may be formed by a combination of two or more of them. Meanwhile, examples of the gas phase method include a physical deposition method and a chemical deposition method, and specific examples include a vacuum deposition method, sputtering method, an ion plating method, a laser application method, a thermal chemical vapor deposition (CVD) method, and a plasma chemical vapor deposition method, and the like. Well-known methods, such as electroplating and electroless plating, can be used as the liquid phase method. Examples of the firing method include a method in which a granular negative electrode active material is mixed with a bonding agent and the like, dispersed in a solvent, coated, and then a thermal treatment is carried out at a temperature higher than the melting points of the bonding agent and the like. Well-known methods can be used as the firing method, and examples thereof include an atmospheric firing method, a reactive firing method, and a hot press firing method.

When metallic lithium is used as the negative electrode active material, the negative electrode active material layer 34B may be already present from the moment of assembling, but may not be present at the moment of assembling and be composed of lithium metal that is precipitated during charging. In addition, the negative electrode collector 34A may not be included by using the negative electrode active material layer 34B as a collector.

(Insulating Layer)

The insulating layer 39 is composed of the separator 35 and the electrolytic solution holding layer 36 formed on at least one surface of the separator 35. Meanwhile, the insulating layer 39 may be composed of only the electrolytic solution holding layer 36 without the separator 35.

(Separator)

The separator 35 is a porous material that separates the positive electrode 33 and the negative electrode 34, prevents short-circuiting of electric currents caused by the contact of both electrodes, and passes lithium ions. The separator 35 is composed of a porous film composed of a polyolefin-based resin, such as polyethylene and polypropylene, a porous film composed of a ceramic, or the like. The separator may be a laminate of two or more of the above porous films. An electrolytic solution is impregnated in the separator 35.

(Electrolytic Solution Holding Layer)

The electrolytic solution holding layer 36 includes a porous polymer compound and an electrolytic solution. In the electrolytic solution holding layer 36, the electrolytic solution is held in pores in the porous polymer compound and swells the porous polymer compound. Meanwhile, the electrolytic solution holding layer 36 may have, solely or together with the separator 35, functions of separating the positive electrode 33 and the negative electrode 34, preventing short-circuiting of electric currents caused by the contact of both electrodes, and passing lithium ions.

In the electrolytic solution holding layer 36, a polymer material having an optimal material kind and composition is used as the material of the porous polymer compound. Thereby, the porous polymer compound being excessively swollen during heat pressing in a battery-manufacturing process such that the porous structure is collapsed, and the pores are closed, is suppressed. In addition, since the permeability is optimally adjusted in the electrolytic solution holding layer 36, degradation of the ion conductivity is suppressed, and thus degradation of the battery characteristics is suppressed. In addition, since adhesiveness between the positive electrode and the negative electrode can be improved by using a polymer material having an optimal material kind and composition as a material of the porous polymer compound, it is possible to suppress the inter-electrode distance from becoming uneven due to repetition of charging and discharging.

The porous polymer compound is formed, for example, in the following manner. That is, firstly, a solution containing a polymer material dissolved in a first solvent composed of a polar organic solvent, such as N-methyl-2-pyrrolidone, γ-butyrolactone, N,N-dimethylacetamide, and N,N-dimethyl sulfoxide, is prepared, and the solution is coated on the separator 35. Next, the separator 35 coated with the solution is immersed in a second solvent which is compatible with the polar organic solvent, such as water, ethyl alcohol, and propyl alcohol, and is a poor solvent with respect to the polymer material. At this time, solvent exchange occurs, and phase separation accompanying spinodal decomposition occurs so that the polymer material can form a porous structure. After that, the separator is dried so that a porous polymer compound having a porous structure can be obtained. Meanwhile, the electrolytic solution holding layer 36 is formed by impregnating the electrolytic solution in the porous polymer compound.

N-methyl-2-pyrrolidone is preferred as the first solvent. This is because the solubility is not degraded, and a uniform solution can be easily prepared even when a vinylidene fluoride polymer, which will be described below and has hexafluoropropylene monomer units in a mass composition ratio of 5% or less, is used as the polymer material.

Preferable examples of the area density of the porous polymer compound formed on the separator 35 are 0.1 mg/cm$^2$ or more to 10 mg/cm$^2$ or less. This is because, when the area density of the porous polymer compound is smaller than 0.1 mg/cm$^2$, it becomes difficult to develop a protection effect with respect to an oxidative decomposition reaction. This is because, when the area density of the porous polymer compound is larger than 10 mg/cm$^2$, the length of the ion conduction path is extended by an increase in the inter-electrode distance such that the energy density tends to be degraded.

Vinylidene fluoride polymers including vinylidene fluoride monomer units can be used as the polymer material. Such vinylidene fluoride polymers include vinylidene fluoride homopolymers, a two-element copolymer of vinylidene fluoride-hexafluoropropylene, a three-element copolymer of vinylidene fluoride-hexafluoropropylene-chlorotrifluoroethylene, and the like. Meanwhile, one or two or more of other polymer materials may be used together with the vinylidene fluoride copolymer.

Polymers having vinylidene fluoride monomer units and hexafluoropropylene monomer units in a mass composition ratio, or vinylidene fluoride monomer units:hexafluoropropylene monomer units, in a range of 100:0 to 95:5 is used as the vinylidene fluoride polymer. That is, vinylidene fluoride copolymers having vinylidene fluoride monomer units and hexafluoropropylene monomer units in a mass composition ratio of 5% or less can be used. When the mass composition ratio of the vinylidene fluoride monomer units and the hexafluoropropylene monomer units is outside the range of 100:0 to 95:5, that is, when the mass composition ratio of the hexafluoropropylene monomer units exceeds 5%, the polymer compound becomes liable to swell, and the pore structure of the porous polymer compound is collapsed during heat pressing in a battery-manufacturing process such that the pores are closed, the air permeability is increased, and the ion conductivity is degraded, whereby the battery characteristics are degraded.

The weight average molecular weight of the vinylidene fluoride polymer is preferably 500,000 or more, and more preferably 750,000 or more. In the laminate film-type battery, it is important to keep the inter-electrode distance between the positive electrode and the negative electrode constant so as to maintain a favorable ion conductivity. From the viewpoint of maintaining the inter-electrode distance constant, it is important to strongly bond the positive electrode 33 and the negative electrode 34 through the insulating layer 39. Therefore, the weight average molecular weight of the vinylidene fluoride polymer is preferably 500,000 or more, and more preferably 750,000 or more since a favorable adhesiveness between the electrodes can be secured. In addition, the weight average molecular weight of the vinylidene fluoride polymer is preferably less than 1.5 million, more preferably 1.2 million or less, and further preferably 1 million or less from the standpoint of easy manufacturing.

Meanwhile, the weight average molecular weight is measured by gel permeation chromatography (GPC) and polystyrene conversion using a measurement solvent of N-methyl-2-pyrrolidone.

The air permeability of the porous polymer compound is preferably 500 seconds/100 cc or less, and more preferably 300 seconds/100 cc or less since a favorable ion conductivity can be secured. In addition, the lower limit of the air permeability becomes a numeric value larger than 0 second/100 cc when the physical structure of the insulating layer 39 is taken into consideration.

The electrolytic solution holding layer 36 may contain inorganic particles in addition to the porous polymer compound and the electrolytic solution. The inorganic particles being contained in the electrolytic solution holding layer 36 can further suppress leakage of electric currents when continuous float charging is carried out.

In this case, the porous polymer compound is formed, for example, in the following manner. That is, firstly, a solution containing the inorganic particles dispersed in a polar organic solvent is added to a solution containing the same polymer material as in the above (vinylidene fluoride polymer) dissolved in a first solvent composed of a polar organic solvent, such as N-methyl-2-pyrrolidone, γ-butyrolactone, N,N-dimethylacetamide, and N,N-dimethyl sulfoxide, so as to prepare a coating solution. The solution is coated on the separator 35. Next, the separator 35 coated with the solution is immersed in a second solvent which is compatible with the polar organic solvent, such as water, ethyl alcohol, and propyl alcohol, and is a poor solvent with respect to the polymer material. At this time, solvent exchange occurs, and phase separation accompanying spinodal decomposition occurs so that the polymer material can form a porous structure. After that, a porous polymer compound having a porous structure can be obtained by drying the polymer material. Meanwhile, the electrolytic solution holding layer 36 is formed by impregnating the electrolytic solution in the porous polymer compound.

(Inorganic Particles)

The inorganic particles include particles of metallic oxides, particles of metallic nitrides, particles of metallic carbides, and the like, all of which have electrical insulating properties. The metallic oxides that can be preferably used include alumina ($Al_2O_3$), magnesia (MgO), titania ($TiO_2$), zirconia ($ZrO_2$), silica ($SiO_2$), and the like. The metallic nitrides that can be preferably used include silicon nitride ($Si_3N_4$), aluminum nitride (AlN), boron nitride (BN), titanium nitride (TiN), and the like. The metallic carbides that can be preferably used include silicon carbide (SiC), boron carbide ($B_4C$), and the like. These inorganic particles may be used singly or in combination of two or more kinds. The mass ratio of the vinylidene fluoride polymer to the inorganic particles, or the vinylidene fluoride polymer: the inorganic particles, is, for example, 1:1 to 1:10. Since, when the added amount of the inorganic particles is too large, the adhesiveness between the positive electrode and the negative electrode becomes weak, the mass ratio of the vinylidene fluoride polymer to the inorganic particles is preferably 1:1 to 1:8, and more preferably 1:2 to 1:6.

(Electrolytic Solution)

The electrolytic solution includes a solvent and an electrolyte salt that is dissolved in the solvent.

(Solvent)

As the solvent, for example, a high-permittivity solvent can be used. The high-permittivity solvent that can be used includes cyclic carbonates, such as ethylene carbonate and propylene carbonate, and the like. Instead of the cyclic carbonates or together with the cyclic carbonates, lactones, such as γ-butyrolactone and γ-valerolactone, lactams, such as N-methyl-pyrrolidone, cyclic carbamic acid esters, such as N-methyloxazolidinone, or sulfone compounds, such as tetramethylene sulfone, may be used as the high-permittivity solvent.

A mixture of the high-permittivity solvent and a low-viscosity solvent may be used as the solvent. The low-viscosity solvent includes chain-like carbonate esters, such as ethyl methyl carbonate, diethyl carbonate, dimethyl carbonate, and methyl propyl carbonate; chain-like carboxylate esters, such as methyl acetate, ethyl acetate, methyl propionate, ethyl propionate, methyl butyrate, methyl isobutyrate, methyl trimethylacetate, and ethyl trimethylacetate; chain-like amides, such as N,N-dimethylacetamide; chain-like carbamic acid esters, such as N,N-diethylcarbamyl methyl and N,N-diethylcarbamyl ethyl; ethers, such as 1,2-dimethoxy ethane, tetrahydrofuran, tetrahydropyran, and 1,3-dioxolane. Meanwhile, the solvent is not limited to the compounds as exemplified above, and compounds as suggested in the past can be widely used.

(Electrolyte Salt)

The electrolyte salt contains, for example, one or two or more of light metal salts, such as lithium salts.

Examples of the lithium salts include inorganic lithium salts, such as lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium perchlorate ($LiClO_4$), and lithium tetrachloroaluminate ($LiAlCl_4$). In addition, examples of the lithium salts include lithium salts of perfluoroalkanesulfonate derivatives, such as lithium trifluoromethanesulfonate ($CF_3SO_3Li$), lithium bis(trifluoromethanesulfonyl)imide (($CF_3SO_2)_2NLi$), lithium bis(pentafluoroethanesulfonyl)imide (($C_2F_5SO_2)_2NLi$), and lithium tris(trifluoromethanesulfonyl)methide (($CF_3SO_2)_3CLi$); boron-containing lithium salts, such as lithium tetrafluoroborate ($LiBF_4$) and $LiB(C_2O_4)_2$; and the like.

(Method of Manufacturing the Non-Aqueous Electrolyte Battery)

The non-aqueous electrolyte battery is manufactured by, for example, the following manufacturing method.

(Manufacturing of the Positive Electrode)

Firstly, the positive electrode 33 is manufactured. For example, a positive electrode material, a bonding agent, and a conducting agent are mixed so as to produce a positive electrode compound, and then the positive electrode compound is dispersed in an organic solvent, thereby producing a paste-like positive electrode compound slurry. Subsequently, the positive electrode compound slurry is evenly coated and dried on both surfaces of the positive electrode collector 33A using a doctor blade or a bar coater. Lastly, the coated films are compacted using a roll press machine or the like while being heated according to necessity so as to form the positive electrode active material layer 33B. In this case, the compacting may be repeated plural times.

(Manufacturing of the Negative Electrode)

Next, the negative electrode 34 is manufactured. For example, a negative electrode material, a bonding agent, and, according to necessity, a conducting agent are mixed so as to produce a negative electrode compound, and then the negative electrode compound is dispersed in an organic solvent, thereby producing a paste-like negative electrode compound slurry. Subsequently, the negative electrode compound slurry is evenly coated and dried on both surfaces of the negative electrode collector 34A using a doctor blade or a bar coater. Lastly, the coated films are compacted using a roll press machine or the like while being heated according to necessity so as to form the negative electrode active material layer 34B.

(Formation of the Porous Polymer Compound)

Firstly, the above polymer material is coated on one surface or both surfaces of the separator 35. The polymer material is dissolved in the first solvent composed of a polar organic solvent, such as N-methyl-2-pyrrolidone, γ-butyrolactone, N,N-dimethylacetamide, and N,N-dimethyl sulfoxide, the solution is coated on the separator 35, the separator 35 coated with the solution is immersed in the second solvent which is compatible with the polar organic solvent, such as water, ethyl alcohol, and propyl alcohol, and is a poor solvent with respect to the polymer material, and dried. Thereby, the separator 35 having the porous polymer compound formed on one surface or both surfaces is manufactured.

Next, the positive electrode lead 31 is attached to the positive electrode 33, and the negative electrode lead 32 is attached to the negative electrode 34. Subsequently, the positive electrode 33 and the negative electrode 34 are laminated through the separator 35 having the porous polymer compound formed on one surface or both surfaces, and wound. After that, the protective tape 37 is adhered on the outermost circumferential portion so as to manufacture a wound body, which is a precursor of the wound electrode body 30. The wound body is accommodated in the bag-shaped exterior member 40.

After the electrolytic solution is prepared and injected into the exterior member 40, the opening portion of the exterior member 40 is sealed through thermal fusion bonding and the like. Lastly, heat pressing is carried out. That is, the exterior member 40 is heated with application of a load, and the separator 35 is closely adhered to the positive electrode 33 and the negative electrode 34 through the porous polymer compound. Thereby, the electrolytic solution holding layer 36 is formed. During the hot press, the porous polymer compound swells in the electrolytic solution holding layer 36, but the pore structure of the porous polymer compound is not collapsed, and the pores are maintained. Thereby, the non-aqueous electrolyte battery is completed.

2. Second Embodiment (Configuration of the Non-Aqueous Electrolyte Battery)

Figure 3A:
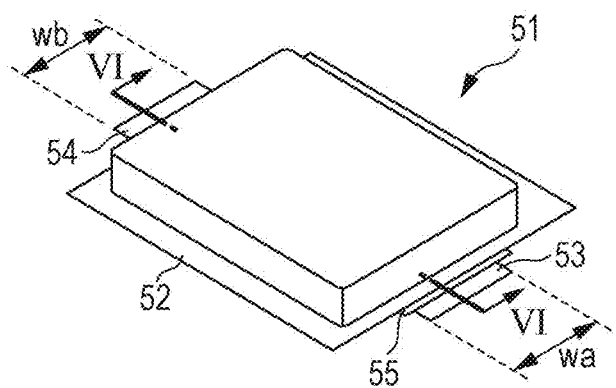
FIG. 3A is a perspective view showing the appearance of the non-aqueous electrolyte battery of the technology.
Figure 3B:
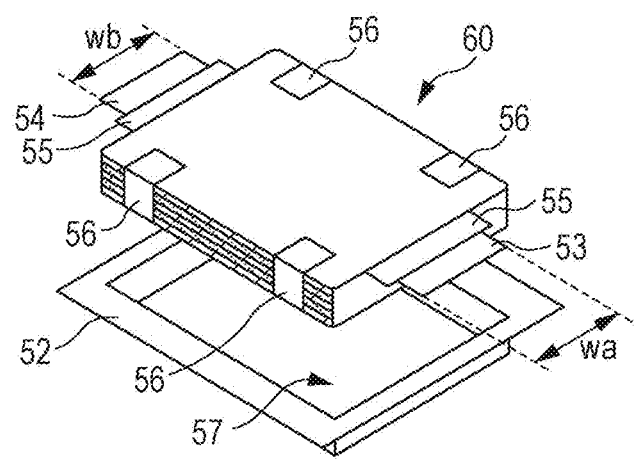
FIG. 3B is a perspective exploded view showing the configuration of the non-aqueous electrolyte battery.
Figure 3C:
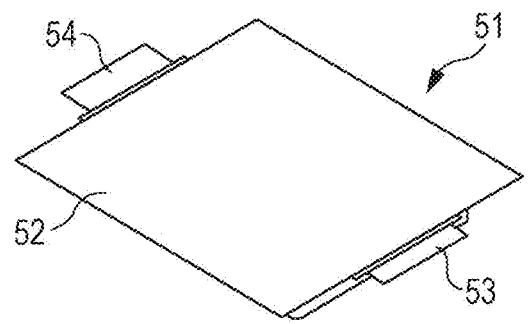
FIG. 3C is a perspective view showing the configuration of the bottom surface of the non-aqueous electrolyte battery shown in FIG. 3A.

An example of the configuration of the non-aqueous electrolyte battery according to the second embodiment of the technology will be described. FIG. 3A is a perspective view showing the appearance of the non-aqueous electrolyte battery according to the second embodiment of the technology. FIG. 3B is a perspective exploded view showing the configuration of the non-aqueous electrolyte battery according to the second embodiment of the technology. FIG. 3C is a perspective view showing the configuration of the bottom surface of the non-aqueous electrolyte battery shown in FIG. 3A. Meanwhile, in the following description, the portion in the non-aqueous electrolyte battery 51 through which the positive electrode lead 53 is drawn out is considered as the top portion, the portion which surfaces the top portion and through which the negative electrode lead 54 is drawn out is considered as the bottom portion, and both sides interposed between the top portion and the bottom portion are considered as the side portions. In addition, description will be made with an assumption that the side portion to side portion direction of the electrodes and the electrode leads is considered as the width.

As shown in FIGS. 3A to 3C, the non-aqueous electrolyte battery 51 of the technology is, for example, a secondary battery that can be charged and discharged, and has a battery element 60 covered with a laminate film 52. The positive electrode lead 53 and the negative electrode lead 54, which are connected to the battery element 60, are drawn out toward the outside of the battery from the portion at which the laminate film 52 is sealed. The positive electrode lead 53 and the negative electrode lead 54 are drawn out from the mutually facing sides.

(Battery Element)

Figure 4B:
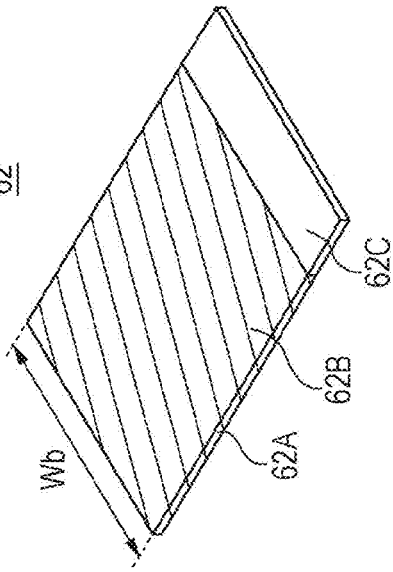
FIG. 4B is a perspective view showing an example of the configuration of the positive electrode.
Figure 4D:
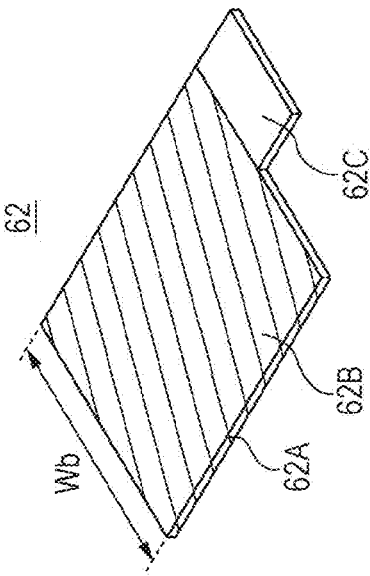
FIG. 4D is a perspective view showing an example of the configuration of the positive electrode.
Figure 4A:
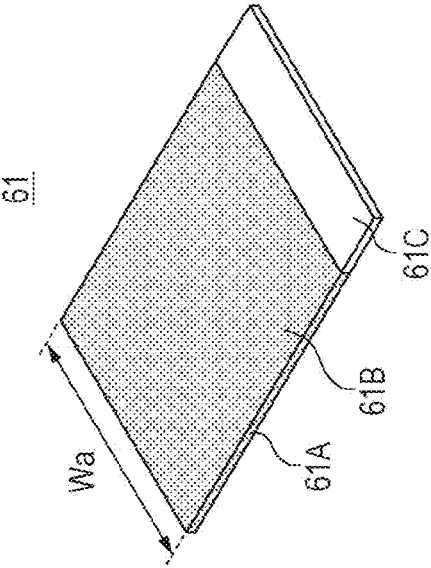
FIG. 4A is a perspective view showing an example of the configuration of the positive electrode.
Figure 4C:
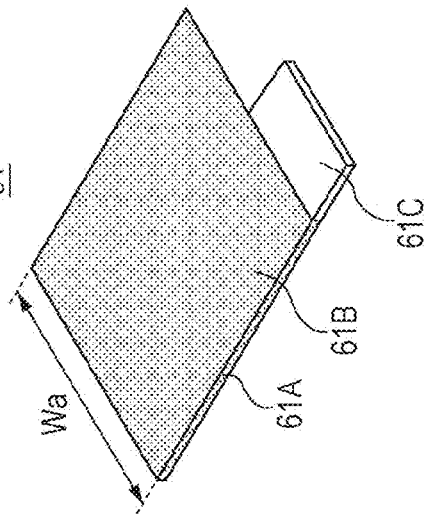
FIG. 4C is a perspective view showing an example of the configuration of the positive electrode.
Figure 5A:
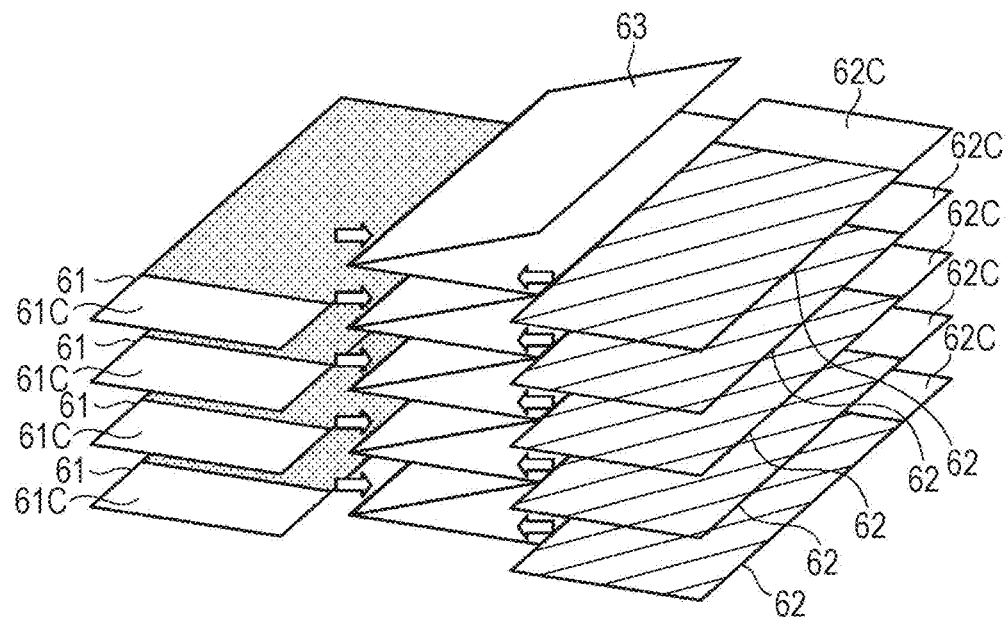
FIG. 5A is a perspective view showing an example of the configuration of the battery element of the technology.
Figure 5B:
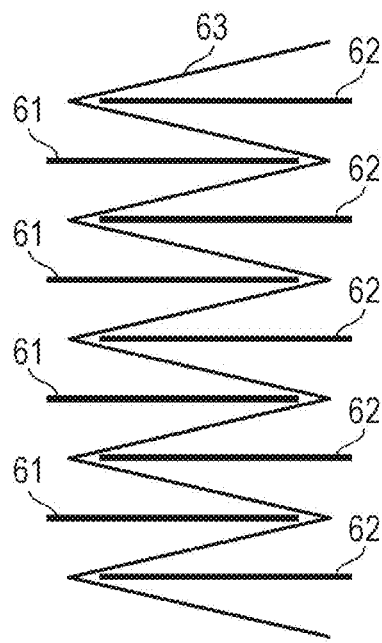
FIG. 5B is a cross-sectional view showing an example of the configuration of the battery element of the technology.

FIGS. 4A to 4B show examples of the configuration of the positive electrode composing the battery element. FIGS. 4C to 4B show examples of the configuration of the negative electrode composing the battery element. FIGS. 5A to 5B show an example of the configuration of the battery element before being covered with a laminate film. The battery element 60 has a configuration in which a rectangular positive electrode 61 shown in FIG. 4A or 4B and a rectangular negative electrode 62 shown in FIGS. 4C and 4D are laminated through a separator 63. Specifically, in the configuration, the positive electrode 61 and the negative electrode 62 are mutually laminated through the separator 63 that is folded like a hairpin as shown in FIGS. 5A and 5B. In the second embodiment, the battery element 60 in which the separator 63, the negative electrode 62, the separator 63, the positive electrode 61, . . . , the negative electrode 62, the separator 63 are laminated in this order so that the outermost layer of the battery element 60 acts as the separator 63 is used. Meanwhile, although not shown in FIGS. 5A and 5B, a porous polymer compound is formed on both surfaces of the separator 63. An electrolytic solution holding layer is formed by impregnating an electrolytic solution in the porous polymer compound.

Figure 6:
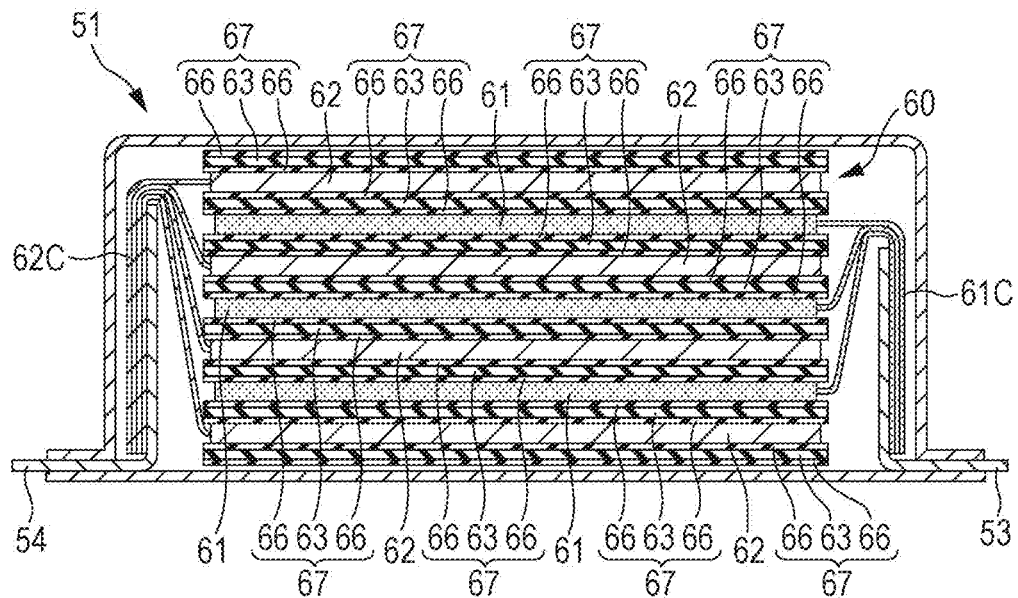
FIG. 6 is a cross-sectional view showing the VI-VI cross section of the non-aqueous electrolyte battery in FIG. 3A.

FIG. 6 is a cross-sectional view showing the VI-VI cross section of the non-aqueous electrolyte battery in FIG. 3A. As shown in FIG. 6, in the battery element 60, the electrolytic solution holding layers 66 are formed on both surfaces of the separator 63, and the separator 63 and the positive electrode 61 and the separator 63 and the negative electrode 62 are adhered through the electrolytic solution holding layer 66, respectively. In addition, the positive electrode 61 and the negative electrode 62 are adhered through the insulating layer 67. Provision of the insulating layer 67 between the positive electrode 61 and the negative electrode 62 increases the adhesiveness between the positive electrode 61 and the negative electrode 62 so as to suppress the inter-electrode distance from becoming uneven due to repetition of charging and discharging. Meanwhile, the electrolytic solution holding layer 66 may be formed on only one surface of the separator 63.

Positive electrode tabs 61C extended out respectively from plural sheets of the positive electrode 61 and negative electrode tabs 62C extended out respectively from plural sheets of the negative electrode 62 are drawn out from the battery element 60. Positive electrode tabs 61C stacked in plural sheets are configured to be folded so that the cross section becomes an approximately U shape in a state of having an appropriate slack at the folded portion. The positive electrode lead 53 is connected to the front end portion of the positive electrode tabs 61C stacked in plural sheets by a method of ultrasonic welding, resistance welding, or the like.

In addition, similarly to the positive electrode 61, the negative electrode tabs 62C are stacked in plural sheets, and configured to be folded so that the cross section becomes an approximately U shape in a state of having an appropriate slack at the folded portion. The negative electrode lead 54 is connected to the front end portion of the negative electrode tabs 62C stacked in plural sheets by a method of ultrasonic welding, resistance welding, or the like.

(Positive Electrode Lead)

A metallic lead body composed of, for example, aluminum can be used as the positive electrode lead 53 that is connected to the positive electrode tabs 61C. In the high-capacity non-aqueous electrolyte battery 51 of the technology, the positive electrode lead 53 is set to be wider and thicker than in the past in order to draw large electric currents out.

The width of the positive electrode lead 53 can be arbitrarily set, but the width wa of the positive electrode lead 53 is preferably 50% or more to 100% or less with respect to the width Wa of the positive electrode 61 from the standpoint of drawing large electric currents out.

The thickness of the positive electrode lead 53 is preferably 150 µm or more to 250 µm or less. When the thickness of the positive electrode lead 53 is less than 150 µm, the amount of electric current drawn out becomes small. When the thickness of the positive electrode lead 53 exceeds 250 µm, the positive electrode lead 53 is too thick, and therefore the sealing performance of the laminate film 52 at the lead drawing-out side is degraded, and moisture can easily intrude.

Meanwhile, a sealant 55, which is an adhering film for improving the adhesiveness between the laminate film 52 and the positive electrode lead 53, is provided at a part of the positive electrode lead 53. The sealant 53 is composed of a resin material having a high adhesiveness with a metallic material, and, for example, the sealant is preferably composed of a polyolefin resin, such as polyethylene, polypropylene, modified polyethylene, and modified polypropylene, when the positive electrode lead 53 is composed of the above metallic material.

The thickness of the sealant 55 is preferably 70 µm or more to 130 µm or less. When the thickness of the sealant is less than 70 µm, the adhesiveness between the positive electrode lead 53 and the laminate film 52 is degraded, and, when the thickness of the sealant exceeds 130 µm, the flowing amount of a molten resin is large during thermal fusion bonding, which is not preferred for the manufacturing process.

(Negative Electrode Lead)

A metallic lead body composed of, for example, nickel (Ni) can be used as the negative electrode lead 54 that is connected to the negative electrode tabs 62C. In the high-capacity non-aqueous electrolyte battery 51 of the technology, the negative electrode lead 54 is set to be wider and thicker than in the past in order to draw large electric currents out. It is preferable that the width of the negative electrode lead 54 be substantially the same as the width of the negative electrode tabs 62C as described below.

The width of the negative electrode lead 54 can be arbitrarily set, but the width wb of the negative electrode lead 54 is preferably 50% or more to 100% or less with respect to the width Wb of the negative electrode 62 from the standpoint of drawing large electric currents out.

The thickness of the negative electrode lead 54 is, similarly to the thickness of the positive electrode lead 53, preferably 150 µm or more to 250 µm or less. When the thickness of the negative electrode lead 54 is less than 150 µm, the amount of electric current drawn out becomes small. When the thickness of the negative electrode lead 54 exceeds 250 µm, the negative electrode lead 54 is too thick, and therefore the sealing performance of the laminate film 52 at the lead drawing-out side is degraded, and moisture can easily intrude.

Similarly to the positive electrode lead 53, the sealant 55, which is an adhering film for improving the adhesiveness between the laminate film 52 and the negative electrode lead 54, is provided at a part of the negative electrode lead 54.

Meanwhile, ordinarily, the width wa of the positive electrode lead 53 and the width wb of the negative electrode lead 54 are the same width w (hereinafter, when the width wa of the positive electrode lead 53 and the width wb of the negative electrode lead 54 are the same, the width wa of the positive electrode lead 53 and the width wb of the negative electrode lead 54 are not differentiated, and are appropriately called the width w of the electrode lead). In addition, when the width Wa of the positive electrode 61 and the width Wb of the negative electrode 62 are different, the width w of the electrode lead is preferably 50% or more to 100% or less with respect to the width W of the electrode, which is the wider of the width Wa of the positive electrode 61 and the width Wb of the negative electrode 62.

(Positive Electrode)

As shown in FIGS. 4A and 4B, the positive electrode 61 has the positive electrode active material layers 61B containing a positive electrode active material formed on both surfaces of the positive electrode collector 61A. As the positive electrode collector 61A, for example, a metal foil, such as an aluminum (Al) foil, a nickel (Ni) foil, and a stainless steel (SUS) foil, is used.

In addition, the positive electrode tab 61C is integrally extended out from the positive electrode collector 61A. The positive electrode tabs 61C stacked in plural sheets are folded so that the cross section becomes an approximately U-shape, and the positive electrode lead 53 is connected to the front end portion by a method, such as ultraviolet welding or resistance welding.

The positive electrode active material layer 61B is formed on the rectangular main surface portion of the positive electrode collector 61A. The extended-out portion in a state in which the positive electrode collector 61 is exposed is provided with functions as the positive electrode tab 61C, which is a connecting tab for connecting the positive electrode lead 53. The width of the positive electrode tab 61C can be arbitrarily set. Particularly, when the positive electrode lead 53 and the negative electrode lead 54 are drawn out from the same side, the width of the positive electrode tab 61C should be less than 50% of the width of the positive electrode 61. The positive electrode 61 is obtained by forming the positive electrode active material layer 61B at one side of the rectangular positive electrode collector 61A so as to provide the positive electrode collector exposed portion and cutting unnecessary portions.

The configuration of the positive electrode active material layer 61B is the same as that of the positive electrode active material layer 33B of the first embodiment. That is, the positive electrode active material layer 61B includes one or two or more of positive electrode materials that can absorb and discharge lithium as the positive electrode active material, and may also include other materials, such as a bonding agent and a conducting agent, according to necessity. The positive electrode material, the bonding agent, and the conducting agent are the same as in the first embodiment.

(Negative Electrode)

As shown in FIGS. 4C and 4D, the negative electrode 62 has the negative electrode active material layers 62B containing a negative electrode active material formed on both surfaces of the negative electrode collector 62A. The negative electrode collector 62A is composed of, for example, a metal foil, such as a copper (Cu) foil, a nickel (Ni) foil, and a stainless steel (SUS) foil.

In addition, the negative electrode tab 62C is integrally extended out from the negative electrode collector 62A. The negative electrode tabs 62C stacked in plural sheets are folded so that the cross section becomes an approximately U-shape, and the negative electrode lead 54 is connected to the front end portion by a method, such as ultraviolet welding or resistance welding.

The negative electrode active material layer 62B is formed on the rectangular main surface portion of the negative electrode collector 62A. The extended-out portion in a state in which the negative electrode collector 62A is exposed is provided with functions as the negative electrode tab 62C, which is a connecting tab for connecting the negative electrode lead 54. The width of the negative electrode tab 62C can be arbitrarily set. Particularly, when the positive electrode lead 53 and the negative electrode lead 54 are drawn out from the same side, the width of the negative electrode tab 62C should be less than 50% of the width of the negative electrode 62. The negative electrode 62 is obtained by forming the negative electrode active material layer 62B at one side of the rectangular negative electrode collector 62A so as to provide the negative electrode collector exposed portion and cutting unnecessary portions.

(Negative Electrode Active Material Layer)

The configuration of the negative electrode active material layer 62B is the same as that of the negative electrode active material layer 62B of the first embodiment. That is, the negative electrode active material layer 62B includes one or two or more of negative electrode materials that can absorb and discharge lithium as the negative electrode active material, and may also include other materials, such as a bonding agent and a conducting agent, according to necessity. The negative electrode material, the bonding agent, and the conducting agent are the same as in the first embodiment.

(Insulating Layer)

An insulating layer 67 is composed of a separator 63 and an electrolytic solution holding layer 66 formed on at least one surface of the separator 63. Meanwhile, the insulating layer 67 may be composed of only the electrolytic solution holding layer 66 without the separator 63.

(Separator)

The separator 63 is composed of an insulating thin film having a large ion permeability and a predetermined mechanical strength. Specifically, the separator 63 is composed of a porous film composed of a polyolefin-based material, such as polypropylene (PP) and polyethylene (PE), or a porous film composed of an inorganic material, such as a ceramic non-woven fabric, and may have a structure in which porous films of two or more of the above are laminated. Among them, a separator including a polyolefin-based porous film, such as polyethylene and polypropylene, is preferred since the separator is excellent in terms of the properties of separating the positive electrode 61 and the negative electrode 62, and internal short-circuiting or degradation of open circuit voltage can be further reduced. The electrolytic solution is impregnated in the separator 63.

(Electrolytic Solution Holding Layer)

The electrolytic solution holding layer 66 is the same as the electrolytic solution holding layer 36 of the first embodiment. That is, the electrolytic solution holding layer 66 includes the same porous polymer compound as in the first embodiment and the same electrolytic solution as in the first embodiment. In the electrolytic solution holding layer 66, the electrolytic solution is held in the pores in the porous polymer compound and swells the porous polymer compound. Meanwhile, the electrolytic solution holding layer 66 may have functions of, singly or together with the separator 63, separating the positive electrode 61 and the negative electrode 63, preventing short-circuiting of electric currents caused by contact of both electrodes, and passing lithium ions.

In the high-capacity non-aqueous electrolyte battery of the technology, the thickness of the separator that can be used is preferably 5 μm or more to 25 μm or less, and more preferably 7 μm or more to 20 μm or less. When the separator 63 is too thick, the packing amount of the active material is lowered so as to degrade the battery capacity, and the ion conductivity is degraded so as to degrade the electric current characteristics. Inversely, when the separator 63 is too thin, the mechanical strength of the film is degraded.

Similarly to the first embodiment, the electrolytic solution holding layer 66 also may contain inorganic particles in addition to the porous polymer compound and the electrolytic solution. The inorganic particles being contained in the electrolytic solution holding layer 66 can further suppress leakage of electric currents when continuous float charging is carried out.

The thickness of the battery element 60 is preferably 5 mm or more to 20 mm or less. When the thickness is less than 5 mm, since the battery element is thin, the battery element tends to be less affected by heat storage and easily lose heat even when there re no recesses and protrusions on the battery surface. On the other hand, when the thickness exceeds 20 mm, the distance from the battery surface to the battery central portion becomes too large such that there is a tendency for a temperature difference to occur in the battery due to only heat radiation from the battery surface, and the service life performance is affected.

In addition, the discharge capacity of the battery element 60 is preferably 3 Ah or more to 50 Ah or less. When the discharge capacity is less than 3 Ah, since the discharge capacity is small, there is a tendency that heat generation can be suppressed even by other methods, such as increasing the thickness of the collecting foil or the like so as to lower the battery capacity and thus decrease the resistance. When the discharge capacity exceeds 50 Ah, there is a tendency that the heat capacity of the battery is increased, and it becomes difficult to radiate heat such that temperature variation in the battery is increased. Here, the discharge capacity of the battery element 60 is the nominal capacity of the non-aqueous electrolyte battery 1, and the nominal capacity is computed from the discharge capacities in the cases of constant voltage and constant current charging under the charging conditions of the upper limit voltage of 3.6 V and the charging current of 0.2 C and constant current discharging under the discharging conditions of the discharge final voltage of 2.0 V and the discharging current of 0.2 C.

(Laminate Film)

Figure 7:
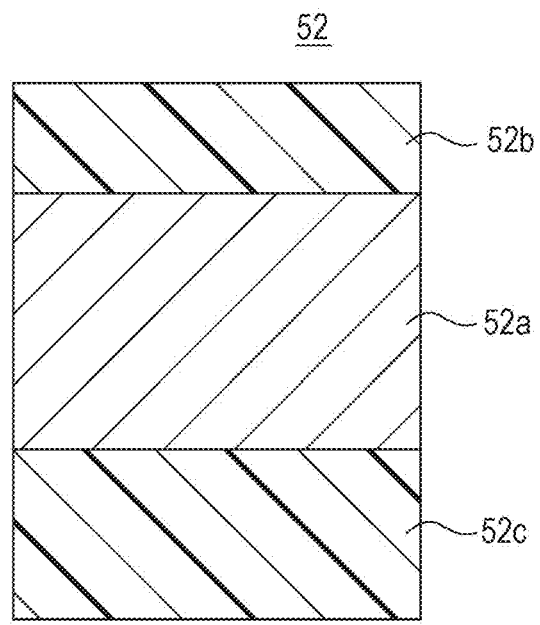
FIG. 7 is a cross-sectional view showing an example of the configuration of the laminate film.

The laminate film 52, which is an exterior body that covers the battery element 60, has a configuration in which resin layers are provided on both surfaces of a metal layer 52a composed of a metal foil. An ordinary configuration of the laminate film can be expressed by a laminate structure of an outside resin layer 52b/a metal layer 52a/an inside resin layer 52c as shown in FIG. 7, and the inside resin layer 52c surfaces the battery element 60. Adhering layers having a thickness of about 2 μm or more to 7 μm or less may also be provided among the outside resin layer 52b, the inside resin layer 52c, and the metal layer 52a. Each of the outside resin layer 52b and the inside resin layer 52c may also be composed of plural layers.

Any metallic materials can be used to compose the metal layer 52a as long as the metallic materials are provided with functions as a moisture-resistant barrier film, and the metallic materials that can be used include an aluminum (Al) foil, a stainless steel (SUS) foil, a nickel (Ni) foil, a coated iron (Fe) foil, and the like. Among them, it is preferable to use an aluminum foil that is thin, light, and excellent in terms of workability. Particularly, it is preferable to use, for example, annealed aluminum (JIS A8021P-O), (JIS A8079P-O), (JIS A1N30-0), and the like from the standpoint of workability.

The thickness of the metal layer 52a is preferably 30 μm or more to 150 μm or less. When the thickness of the metal layer 52a is less than 30 μm, the strength of the material is degraded. In addition, when the thickness of the metal layer 52a exceeds 150 μm, working becomes significantly difficult, and the thickness of the laminate film 52 is increased, which leads to degradation of the volume efficiency of the non-aqueous electrolyte battery.

The inside resin layer 52c is a portion that is melted by heat and is thermally fused mutually, and polyethylene (PE), cast propylene (CPP), polyethylene terephthalate (PET), low-density polyethylene (LDPE), high-density polyethylene (HDPE), linear low-density polyethylene (LLDPE), and the like can be used for the inside resin layer. It is also possible to select and use plural kinds from the above.

The thickness of the inside resin layer 52c is preferably set to 20 μm or more to 50 μm or less. When the thickness of the inside resin layer is less than 20 μm, the adhesiveness is degraded, the pressure buffering action becomes insufficient, and short-circuiting becomes liable to occur. In addition, when the thickness of the inside resin layer exceeds 50 μm, it becomes easy for moisture to intrude through the inside resin layer 52c, and there is a concern that gas generation and the resulting battery swelling and degradation of battery characteristics may occur in the battery. Meanwhile, the thickness of the inside resin layer 52c is the thickness in a state in which the battery element 60 is not yet covered. When the battery element 60 is covered with the laminate film 52 and sealed, since two layers of the inside resin layer 52c are thermally fused mutually, there are cases in which the thickness of the inside resin layer 52c is outside the above range.

Meanwhile, the inside resin layer 52c may have recesses and protrusions provided on the surface by, for example, embossing or the like. Thereby, the slip properties of the outermost layer of the battery element 60 between the electrolytic solution holding layer 66 and the laminate film 52 are deteriorated, and the effect of suppressing the movement of the battery element 60 can be increased.

In terms of an aesthetically-pleasing appearance, toughness, flexibility, and the like, a polyolefin-based resin, a polyamide-based resin, a polyimide-based resin, polyester, or the like can be used as the outside resin layer 52b. Specifically, nylon (Ny), polyethylene terephthalate (PET), polyethylene naphthalate (PEN), polybutylene terephthalate (PBT), or polybutylene naphthalate (PBN) can be used, and it is also possible to select and use plural kinds from the above.

Meanwhile, since the inside resin layer 52c is fused by thermal fusion bonding so as to bond the laminate films 52, the outside resin layer 52b preferably has a higher melting point than the inside resin layer 52c. This is for fusing only the inside resin layer 52c during thermal fusion bonding. Therefore, for the outside resin layer 52b, a usable material can be selected according to a resin material selected for the inside resin layer 52c.

The thickness of the outside resin layer 52b is preferably set to 25 μm or more to 35 μm or less. When the thickness of the outside resin layer is less than 25 μm, the functions as a protective layer are degraded, and, when the thickness of the outside resin layer exceeds 35 μm, the volume efficiency of the non-aqueous electrolyte battery 51 is degraded.

The battery element 60 is covered with the laminate films 52. At this time, the positive electrode lead 53 connected to the positive electrode tab 61C and the negative electrode lead 54 connected to the negative electrode tab 62C are drawn out to the outside of the battery from the sealed portion of the laminate films 52. As shown in FIG. 3B, a battery element accommodating portion 57 formed by a deep drawing process in advance is provided between the laminate films 52. The battery element 60 is accommodated in the battery element accommodating portion 57.

In the technology, the peripheral portion of the battery element 60 is heated using a heater head so as to thermally fuse and seal the laminate films 52 which cover the battery element 60 from both surfaces. Particularly, it is preferable to thermally fuse the laminate films 52 using the heater head provided with a notch in a shape that can avoid the positive electrode lead 53 and the negative electrode lead 54 in the lead drawing-out sides. This is because the battery can be manufactured with a reduced load which is applied to the positive electrode lead 53 and the negative electrode lead 54. This method can prevent shorting during the manufacturing of the battery.

The non-aqueous electrolyte battery 51 of the technology obtains good stability and battery characteristics by controlling the thickness of the lead drawing-out portion after the laminate films 52 are sealed through thermal fusion bonding.

(Method of Manufacturing the Non-Aqueous Electrolyte Battery)

The above non-aqueous electrolyte battery 51 can be manufactured by, for example, the following process.

(Manufacturing of the Positive Electrode)

A positive electrode material, a conducting agent, and a bonding agent are mixed so as to prepare a positive electrode compound, and the positive electrode compound is dispersed in a solvent, such as N-methyl-2-pyrrolidone, so as to produce a positive electrode compound slurry. Subsequently, the positive electrode compound slurry is coated on both surfaces of the band-shaped positive electrode collector 61A, and the solvent is dried. Then, compacting is carried out using a roll press machine or the like so as to form the positive electrode active material layer 61B, thereby producing a positive electrode sheet. The positive electrode sheet is cut to have predetermined dimensions, and the positive electrode 61 is manufactured. At this time, the positive electrode active material layer 61B is formed so that a part of the positive electrode collector 61A is exposed. The positive electrode collector 61A exposed portion is used as the positive electrode tab 61C.

In addition, the positive electrode tab 61C may be formed by cutting unnecessary portions in the positive electrode collector exposed portion according to necessity. Thereby, the positive electrode 61 having the positive electrode tab 61C integrally formed is obtained.

(Manufacturing of the Negative Electrode)

A negative electrode material and a bonding agent are mixed so as to prepare a negative electrode compound, and the negative electrode compound is dispersed in a solvent, such as N-methyl-2-pyrrolidone, so as to produce a negative electrode compound slurry. Subsequently, the negative electrode compound slurry is coated on the negative electrode collector 62A, and the solvent is dried. Then, compacting was carried out using a roll press machine or the like so as to form the negative electrode active material layer 62B, thereby producing a negative electrode sheet. The negative electrode sheet is cut to have predetermined dimensions, and the negative electrode 62 is manufactured. At this time, the negative electrode active material layer 62B is formed so that a part of the negative electrode collector 62A is exposed. The negative electrode collector 62A exposed portion is used as the negative electrode tab 62C. In addition, the negative electrode tab 62C may be formed by cutting unnecessary portions in the negative electrode collector exposed portion according to necessity. Thereby, the negative electrode 62 having the negative electrode tab 62C integrally formed is obtained.

(Formation of the Porous Polymer Compound)

A porous polymer compound is formed on the surface of the separator 63. The porous polymer compound is formed, for example, in the following manner. That is, firstly, a solution containing a polymer material dissolved in a first solvent composed of a polar organic solvent, such as N-methyl-2-pyrrolidone, γ-butyrolactone, N,N-dimethylacetamide, and N,N-dimethyl sulfoxide, is prepared, and the solution is coated on the separator 63. Next, the separator 63 coated with the solution is immersed in a second solvent which is compatible with the polar organic solvent, such as water, ethyl alcohol, and propyl alcohol, and is a poor solvent with respect to the polymer material. At this time, solvent exchange occurs, and phase separation accompanying spinodal decomposition occurs so that the polymer material can form a porous structure. Meanwhile, the electrolytic solution holding layer 66 is formed by impregnating the electrolytic solution in the porous polymer compound.

(Laminating Process)

Next, as shown in FIGS. 5A and 5B, the positive electrode 61 and the negative electrode 62 are alternately inserted in the hairpin-like folded separator 63, and the predetermined number of the positive electrodes 61 and the negative electrodes 62 are laminated so that, for example, the separator 63, the negative electrode 62, the separator 63, the positive electrode 61, the separator 63, the negative electrode 62, . . . , the separator 63, the negative electrode 62, the separator 63 are stacked. Subsequently, the positive electrode 61, the negative electrode 62, and the separator 63 are fixed in a pressed state so as to be closely adhered, thereby manufacturing the battery element 60. It is possible to use a fixing member 56, for example, an adhering tape or the like, in order to further strongly fix the battery element 60. When the battery element is fixed using the fixing member 56, the fixing member 56 is provided at, for example, both side portions of the battery element 60.

Next, plural sheets of the positive electrode tab 61C and plural sheets of the negative electrode tab 62C are folded so as to form a U-shaped cross section. The electrode tabs are folded, for example, in the following manner.

(First Process of Folding the Tab into a U Shape)

A plurality of positive electrode tabs 61C pulled out from the laminated positive electrodes 61 and a plurality of negative electrode tabs 62C pulled out from the laminated negative electrodes 62 are folded so that the cross section becomes an approximately U shape. The first process of folding into a U shape is a process for providing an optimal U-like folded shape to the positive electrode tabs 61C and the negative electrode tabs 62C in advance. Provision of the optimal U-like folded shape in advance can prevent stress, such as tensile stress, from being applied to the positive electrode tabs 61C and the negative electrode tabs 62C when the positive electrode lead 53, the negative electrode lead 54, the connected positive electrode tabs 61C and negative electrode tabs 62C are folded so as to form U-like folded portions.

FIGS. 8A to 8E are side surface views that explain the first process of folding the negative electrode tabs 62C into a U shape. In FIGS. 8A to 8E, the respective processes carried out on the negative electrode tabs 62C are explained. Meanwhile, the first process of folding into a U shape is also carried out on the positive electrode collector 61A in the same manner.

Figure 8A:
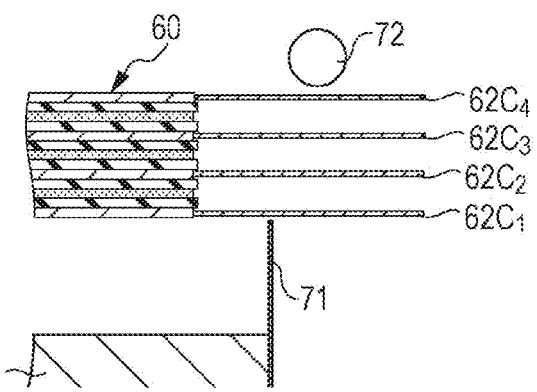
FIGS. 8A to 8E are process charts showing the process of folding into a U shape the electrode tab of the battery element of the technology.

Firstly, as shown in FIG. 8A, the battery element is disposed on the top portion of a work set table 70a having a thin plate for folding into a U shape 71. The thin plate for folding into a U shape 71 is provided so as to protrude from the work set table 70a slightly less, specifically, at least the total thickness of a plurality of the negative electrode tab $62C_1$ to the negative electrode tab $62C_4$ less than the thickness of the battery element 60. In this configuration, since the folded outer circumferential side of the negative electrode tab $62C_4$ is located within the range of the thickness of the battery element 60, an increase in the thickness of the non-aqueous electrolyte battery 51 or occurrence of poor appearance can be prevented.

Figure 8B:
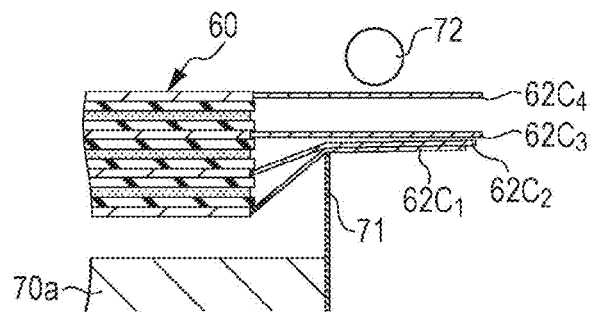

Subsequently, as shown in FIG. 8B, the battery element 60 is moved down, or the work set table 70a is moved up. At this time, since the space efficiency of the non-aqueous electrolyte battery 51 is improved as the gap between the battery element 60 and the thin plate for folding into a U shape 71 is decreased, for example, the gap between the battery element 60 and the thin plate for folding into a U shape 71 is made to decrease gradually.

Figure 8C:
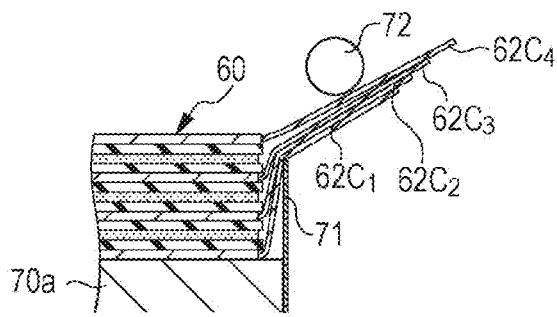
Figure 8D:
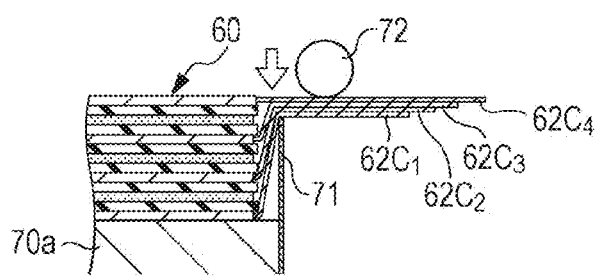
Figure 8E:
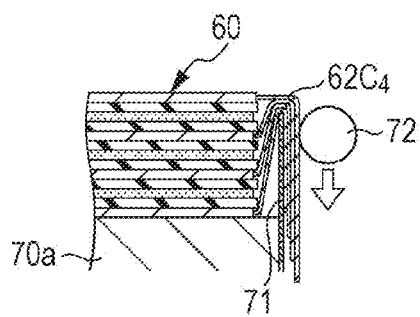

After the battery element 60 is mounted on the work set table 70a, and a folded portion is formed in the negative electrode tab 62C as shown in FIG. 8C, a roller 72 is moved down so that the negative electrode tab 62C is folded into a U shape as shown in FIGS. 8D and 8E.

The thickness of the thin plate for folding into a U shape 71 is 1 mm or less, and preferably, for example, about 0.5 mm. For the thin plate for folding into a U shape 71, it is possible to use a material having a necessary strength to form a folded shape in a plurality of the positive electrode tabs 61C or the negative electrode tabs 62C even with such a thin thickness. The necessary strength of the thin plate for folding into a U shape 71 varies with the number of the laminated sheets of the positive electrode 61 or the negative electrode 62, the hardness of a material used for the positive electrode tab 61C and the negative electrode tab 62C, and the like. As the thin plate for folding into a U shape 71 is thinner, the curvature of the negative electrode tab $62C_1$ at the innermost folded circumference can be reduced, and therefore the necessary space to fold the negative electrode tab 62C can be reduced, which is preferable. Examples of the thin plate for folding into a U shape 71 that can be used include stainless steel (SUS), a reinforced plastic material, a coated steel material, and the like.

(Process of Cutting the Collector Exposed Portion)

Next, the front end of the negative electrode tab 62C having the U-like folded portion formed is cut to have the same dimensions. In the process of cutting the collector exposed portion, a U-like folded portion having an optimal shape in advance is formed, and the excess portions of the positive electrode tab 61C and the negative electrode tab 62C are cut according to the U-like folded shape. FIGS. 9A to 9E are side surface views that explain the process of cutting the negative electrode tab 62C. Meanwhile, the process of cutting the collector exposed portion is also carried out on the positive electrode tab 61C in the same manner.

Figure 9A:
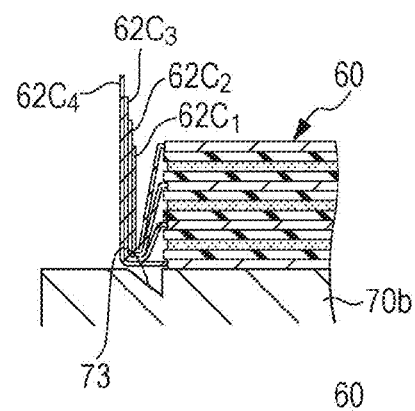
FIGS. 9A to 9E are process charts showing the process of folding into a U shape the electrode tab of the battery element of the technology.

As shown in FIG. 9A, the top surface and the bottom surface of the battery element 60, in which a U-like folded portion is formed in the first process of folding into a U shape, are turned over, and the battery element 60 is fixed on a work set table 70b having an escaping portion for collector slack 73.

Figure 9B:
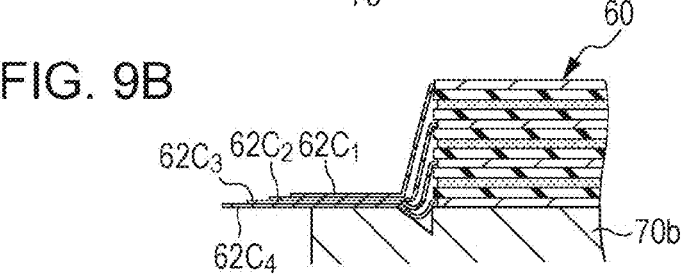

Next, as shown in FIG. 9B, the front end portion which occupies from the U-like folded portions of the negative electrode tab $62C_1$ to the negative electrode tab $62C_4$ having the U-like folded portions formed to the front end is deformed so that the front end portion forms an approximately L shape along the work set table 70b. At this time, maintaining a necessary shape to form a U-like folded portion again generates a slack as large as the negative electrode tab $62C_4$ on the folded outer circumference side. Such a slack enters the escaping portion for collector slack 73 in the work set table 70b so that the negative electrode tab $62C_1$ to the negative electrode tab $62C_4$ can be deformed without stress. Meanwhile, the negative electrode tab $62C_1$ to the negative electrode tab $62C_4$ may be deformed in a state in which the front end portion of the negative electrode tab $62C_1$ to the negative electrode tab $62C_4$ is fixed.

Figure 9C:
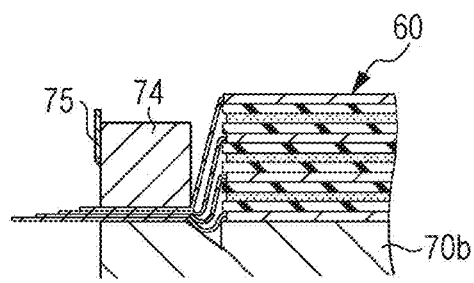
Figure 9D:
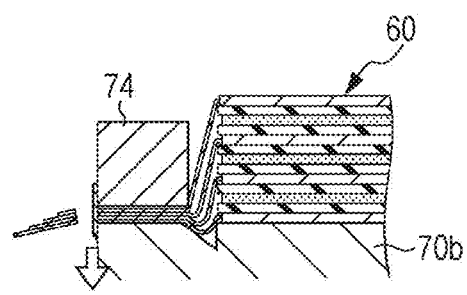
Figure 9E:
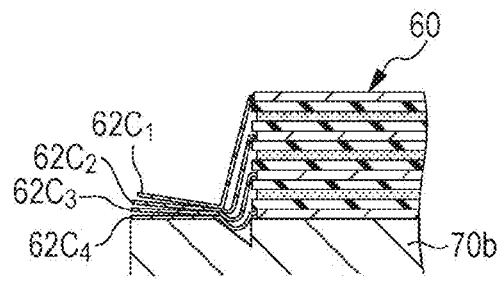

Subsequently, after the negative electrode tab $62C_1$ to the negative electrode tab $62C_4$ are held on the work set table 70b using a collector holding member 74 as shown in FIG. 9C, for example, the front ends of the negative electrode tab $62C_1$ to the negative electrode tab $62C_4$ are cut to have the same dimensions using, for example, a cutting blade 75 provided so as to go along with the collector holding member 74 as shown in FIGS. 9D and 9E. In the cut portions of the negative electrode tab $62C_1$ to the negative electrode tab $62C_4$, at least the excess portions in the front ends of the negative electrode tab $62C_1$ to the negative electrode tab $62C_4$ are cut so that the front ends of the negative electrode tab $62C_1$ to the negative electrode tab $62C_4$ are located within the range of the thickness of the battery element 60 when U-like folding is carried out again later.

(Process of Connecting the Electrode Lead)

Figure 10A:
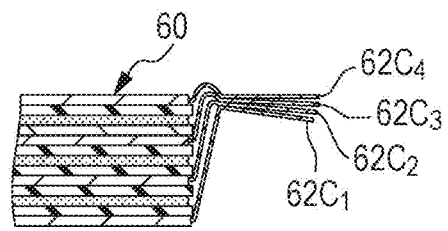
FIGS. 10A to 10C are process charts showing the process of connecting the electrode tab and the electrode lead of the battery element of the technology.
Figure 10B:
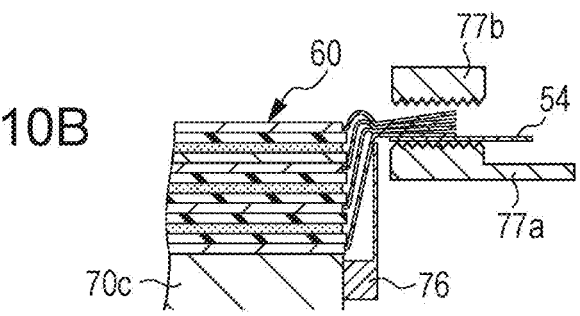
Figure 10C:
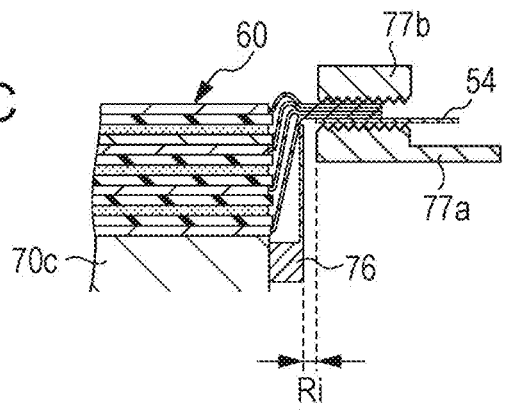

Subsequently, connection between the negative electrode tab $62C_1$ to the negative electrode tab $62C_4$ and the negative electrode lead 54 is carried out. In a process of connecting the tab, the positive electrode tab 61C and the negative electrode tab 62C, and the positive electrode lead 53 and the negative electrode lead 54 are fixed while the optimal U-like folded shape formed in the first process of folding into a U shape is maintained. Thereby, the positive electrode tab 61C and the positive electrode lead 53, and the negative electrode tab 62C and the negative electrode tab 54 are electrically connected. FIGS. 10A to 10C are side surface views that explain the process of connecting the negative electrode tab $62C_1$ to the negative electrode tab $62C_4$ and the negative electrode lead 54. Meanwhile, although not shown, the sealant 55 is provided in advance in the negative electrode lead 54. The connecting process is also carried out on the positive electrode tab 61C and the positive electrode lead 53 in the same manner.

As shown in FIG. 10A, the top surface and the bottom surface of the battery element 60, for which the excess portions at the front ends of the negative electrode tab $62C_1$ to the negative electrode tab $62C_4$ are cut is again turned over. Next, as shown in FIG. 10B, the battery element 60 is fixed on a work set table 70c having a plate for forming and maintaining the collector 76. The front end of the plate for forming and maintaining the collector 76 is located on the folded inner circumference side of the negative electrode tag $62C_1$ so as to maintain the folded shapes of the negative electrode tab $62C_1$ to the negative electrode tab $62C_4$ and prevent the influences of external causes, such as ultrasonic vibration generated from an anchoring device.

Subsequently, as shown in Table 10C, the negative electrode tab $62C_1$ to the negative electrode tab $62C_4$ and the negative electrode lead 54 are fixed by, for example, ultrasonic welding. For example, an anvil 77a provided beneath the bottom portion of the negative electrode tab $62C_1$ to the negative electrode tab $62C_4$ and a horn 77b provided on the top portion of the negative electrode tab $62C_1$ to the negative electrode tab $62C_4$ are used for ultrasonic welding. The negative electrode tab $62C_1$ to the negative electrode tab $62C_4$ are set in the anvil 77a in advance, and the horn 77b is moved down so as to interpose the negative electrode tab $62C_1$ to the negative electrode tab $62C_4$ and the negative electrode lead 54 with the anvil 77a and the horn 77b. In addition, the anvil 77a and the horn 77b supply ultrasonic vibrations to the negative electrode tab $62C_1$ to the negative electrode tab $62C_4$ and the negative electrode lead 54. Thereby, the negative electrode tab $62C_1$ to the negative electrode tab $62C_4$ and the negative electrode lead 54 are mutually anchored.

Meanwhile, in the process of connecting the tab, the negative electrode lead 54 may be connected to the negative electrode tab 62C so as to form the above inner circumferential folding Ri with reference to FIG. 10C. Meanwhile, the inner circumferential folding Ri is set to the thickness or more of the positive electrode lead 53 and the negative electrode lead 54.

Next, the negative electrode lead 54 having the negative electrode tab $62C_1$ to the negative electrode tab $62C_4$ fixed is folded into a predetermined shape. FIGS. 11A to 11E are side surface views that explain a process of folding the tab of the negative electrode lead 54. In addition, the process of folding the tab and the process of connecting the electrode lead are also carried out on the positive electrode tab 61C and the positive electrode lead 53 in the same manner.

Figure 11A:
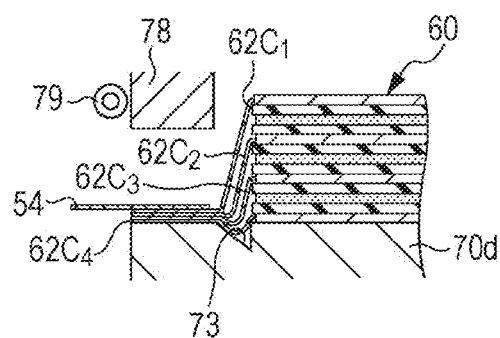
FIGS. 11A to 11E are process charts showing the process of folding the electrode lead connected to the battery element of the technology.

As shown in FIG. 11A, the top surface and the bottom surface of the battery element 60 having the negative electrode tab $62C_1$ to the negative electrode tab $62C_4$ and the negative electrode lead 54 fixed in the connecting process are again turned over, and the battery element 60 is fixed on a work set table 70d having the escaping portion for collector slack 73. The connection portion between the negative electrode tab $62C_1$ to the negative electrode tab $62C_4$ and the negative electrode lead 54 is mounted on a tab folding table 78a.

Figure 11B:
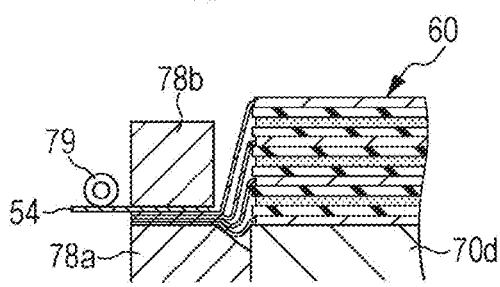
Figure 11C:
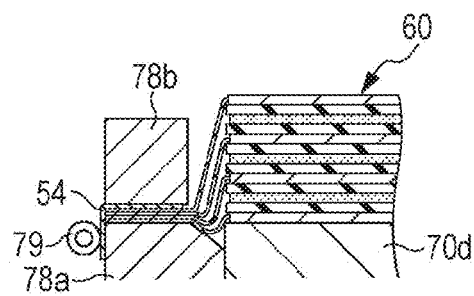

Subsequently, the connection portion between the negative electrode tab $62C_1$ to the negative electrode tab $62C_4$ and the negative electrode lead 54 is held by a block 78b as shown in FIG. 11B, and the negative electrode lead 54 protruding from the tab folding table 78a and the block 78b is folded by moving down a roller 79 as shown in FIG. 11C.

(A Second Process of Folding the Tab into a U Shape)

Figure 11D:
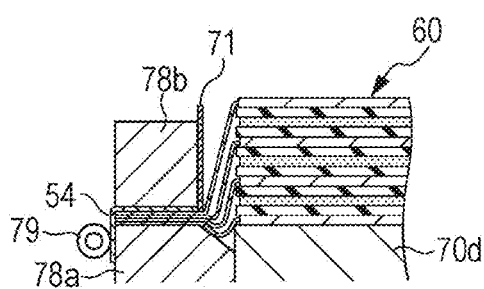
Figure 11E:
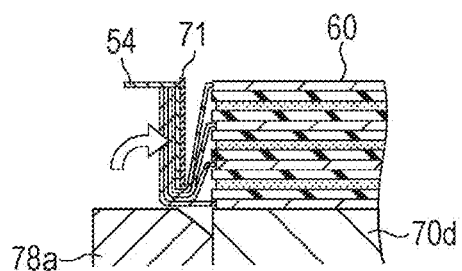

Subsequently, as shown in FIG. 11D, the thin plate for folding into a U shape 71 is disposed between the battery element 60 and the block 78b that holds the negative electrode tab $62C_1$ to the negative electrode tab $62C_4$. Subsequently, as shown in FIG. 11E, the negative electrode tab $62C_1$ to the negative electrode tab $62C_4$ are 90° folded along the U-like folded shape formed in the first process of folding into a U shape which is shown in FIGS. 8A to 8E, thereby manufacturing the battery element 60. At this time, as described above, the negative electrode lead 54 and the negative electrode tab 62C are connected so as to form the inner circumferential folding Ri as shown in FIG. 10C. Thereby, it is possible to fold the negative electrode tab 62C in the substantially perpendicular direction to the electrode surface without the contact between the negative electrode lead 54 and the laminated positive electrode 61 and negative electrode 62 in the second process of folding the tab into a U shape.

At this time, it is preferable to fold the negative electrode lead 54 together with the sealant 55 which is thermally fused in advance. The folded portion in the negative electrode lead 54 is covered with the sealant 55 so that a structure in which the negative electrode lead 54 and the laminate film 52 are not in direct contact with each other can be made. This structure can significantly reduce the friction between the resin layers and the negative electrode lead 54 in the laminate film 52, damage of the laminate film 52, and a risk of short-circuiting of the laminate film 52 with the metal layer, all of which are caused by long-term vibrations, impact, and the like. The battery element 60 is manufactured in the above manner.

(Covering Process)

After that, the manufactured battery element 60 is covered with the laminate film 52, and one of the side portions, the top portion, and the bottom portion are heated using the heater head and thermally fused. The top portion and the bottom portion, through which the positive electrode lead 53 and the negative electrode lead 54 are drawn out, are heated using, for example, a heater head having a notch, and thermally fused.

Subsequently, an electrolytic solution is injected through an opening in the other side portion that is not thermally fused. Finally, the laminate film 52 in the side portion through which the electrolytic solution is injected is thermally fused, and the battery element 60 is sealed in the laminate film 52. After that, heat pressing in which the battery element 60 is pressurized and heated from the outside of the laminate film 52 is carried out, and the electrolytic solution is held in the porous polymer compound formed on the surface of the separator 63. Thereby, the electrolytic solution holding layer 66 is formed. During the hot press, the porous polymer compound swells in the electrolytic solution holding layer 66, but the pore structure of the porous polymer compound is not collapsed, and the pores are maintained. Thereby, the non-aqueous electrolyte battery 51 is completed.

3. Third Embodiment (Configuration of the Non-Aqueous Electrolyte Battery)

Figure 12A:
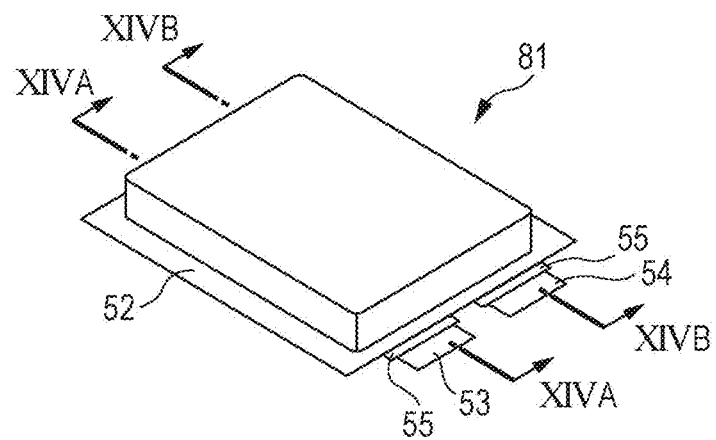
FIG. 12A is a perspective view showing the appearance of the non-aqueous electrolyte battery of the technology.
Figure 12B:
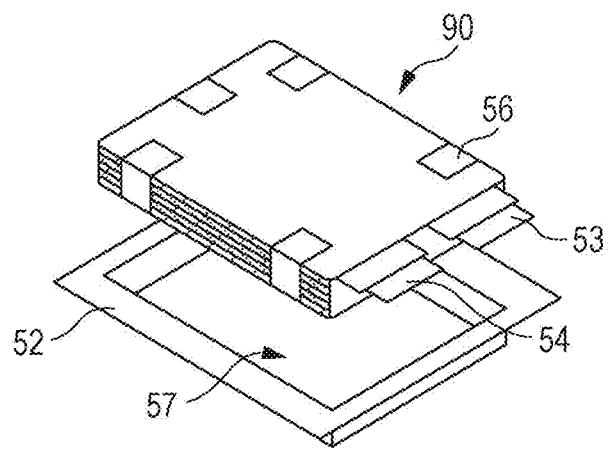
FIG. 12B is a perspective exploded view showing the configuration of the non-aqueous electrolyte battery.

The non-aqueous electrolyte battery according to the third embodiment of the technology will be described. FIG. 12A is a perspective view showing the appearance of the non-aqueous electrolyte battery according to the third embodiment of the technology, and FIG. 12B is an exploded perspective view showing the configuration of the non-aqueous electrolyte battery according to the third embodiment of the technology. In addition, FIG. 12C is a perspective view showing the configuration of the bottom surface of the non-aqueous electrolyte battery shown in FIG. 12A.

The non-aqueous electrolyte battery of the third embodiment is the same as in the second embodiment except that the configuration and the like of the battery element are different from those of the second embodiment. Therefore, in the following, the differences from the second embodiment will be mainly described, and the overlapped portions with the second embodiment will not be described. Meanwhile, in FIGS. 12A to 14B, the similar or corresponding portions to those of the non-aqueous electrolyte battery of the second embodiment will be given similar reference symbols. In addition, in the following description, the portion in the non-aqueous electrolyte battery 81 through which the positive electrode lead 53 and the negative electrode lead 54 are drawn out is considered as the top portion, the portion facing the top portion is considered as the bottom portion, and both sides interposed between the top portion and the bottom portion are considered as the side portions. In addition, description will be made with an assumption that the side portion to side portion direction of the electrodes and the electrode leads is considered as the width.

Figure 12C:
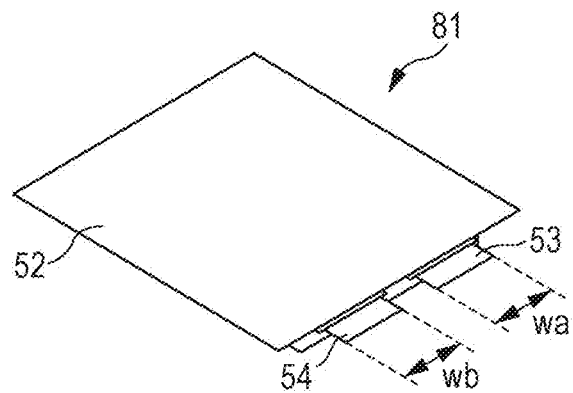
FIG. 12C is a perspective view showing the configuration of the bottom surface of the non-aqueous electrolyte battery shown in FIG. 12A.

As shown in FIGS. 12A to 12C, the non-aqueous electrolyte battery 81 of the third embodiment is, for example, a secondary battery that can be charged and discharged, and has a battery element 90 covered with the laminate film 52. In the non-aqueous electrolyte battery 81, the positive electrode lead 53 and the negative electrode lead 54, which are connected to the battery element 90, are drawn out to the outside of the battery from the portion at which the laminate films 52 are sealed. The positive electrode lead 53 and the negative electrode lead 54 are drawn out from the same side.

The width wa of the positive electrode lead 53 should be less than 50% of the width Wa of the positive electrode 61. This is because the positive electrode lead 53 should be provided at a location at which the positive electrode lead 53 does not come into contact with the negative electrode lead 54. In addition, in this case, the width wa of the positive electrode lead 53 is preferably 15% or more to 40% or less, and more preferably 35% or more to 40% or less of the width Wa of the positive electrode 61 in order to satisfy both the sealing properties of the laminate film 52 and high electric current charging and discharging. In addition, the width wb of the negative electrode lead 54 should be less than 50% of the width Wb of the negative electrode 62. This is because the negative electrode lead 54 should be provided at a location at which the negative electrode lead 54 does not come into contact with the positive electrode lead 53. In addition, in this case, the width wb of the negative electrode lead 54 is preferably 15% or more to 40% or less, and more preferably 35% or more to 40% or less of the width Wa of the negative electrode 62 in order to satisfy both the sealing properties of the laminate film 52 and high electric current charging and discharging.

(Battery Element)

Figure 13A:
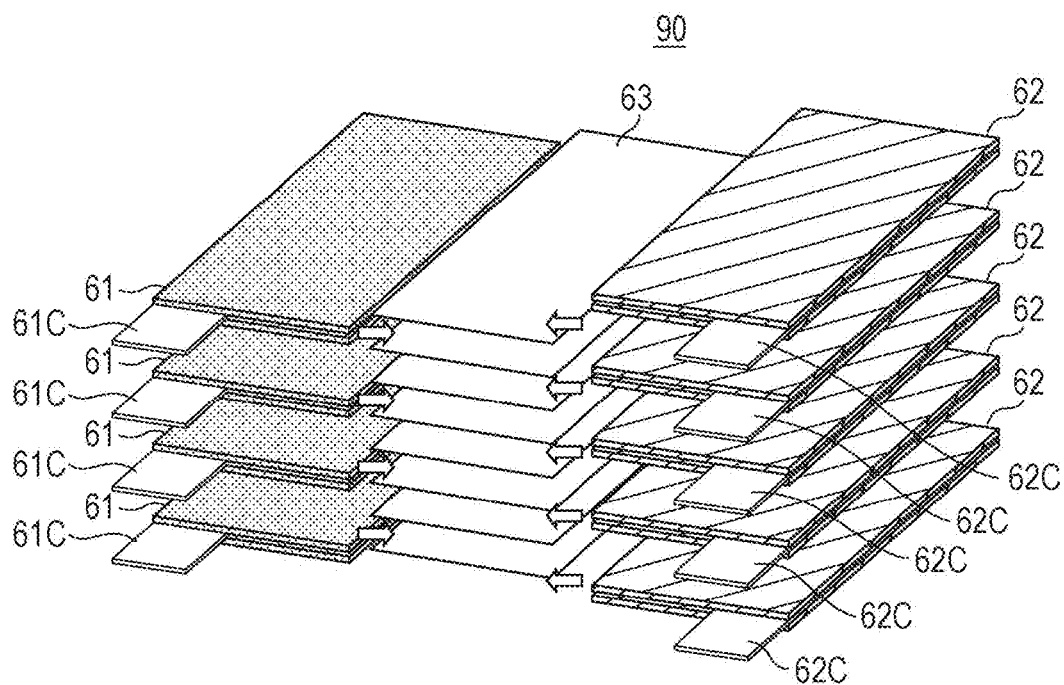
FIG. 13A is a perspective view showing an example of the configuration of the battery element of the technology.
Figure 13B:
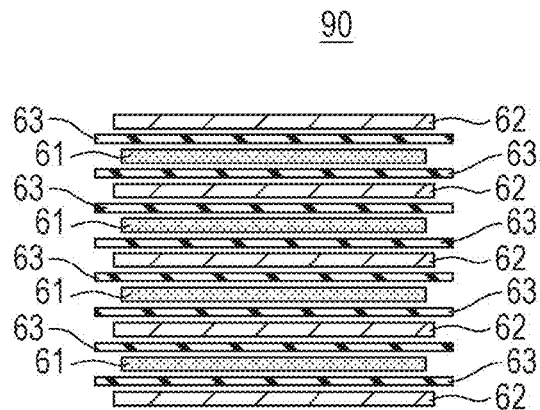
FIG. 13B is a cross-sectional view showing an example of the configuration of the battery element of the technology.

FIGS. 13A to 13B show an example of the configuration of the battery element that is not yet covered with the laminate film. The battery element 60 has a configuration in which the substantially rectangular positive electrode 61 and the substantially rectangular negative electrode 62 disposed opposite to the positive electrode 61 are laminated sequentially through the substantially rectangular separator 63. Specifically, the battery element 60 has a laminate-type electrode structure in which the negative electrode 62, the separator 63, the positive electrode 61, the separator 63, . . . , the separator 63, the negative electrode 62 are alternately laminated. The positive electrode 61 and the negative electrode 62 in the third embodiment have the same configurations as in the second embodiment. Meanwhile, although not shown, the porous polymer compound is formed on both surfaces of the separator 63. The electrolytic solution holding layer 66 is formed by impregnating an electrolytic solution in the porous polymer compound.

Figure 14A:
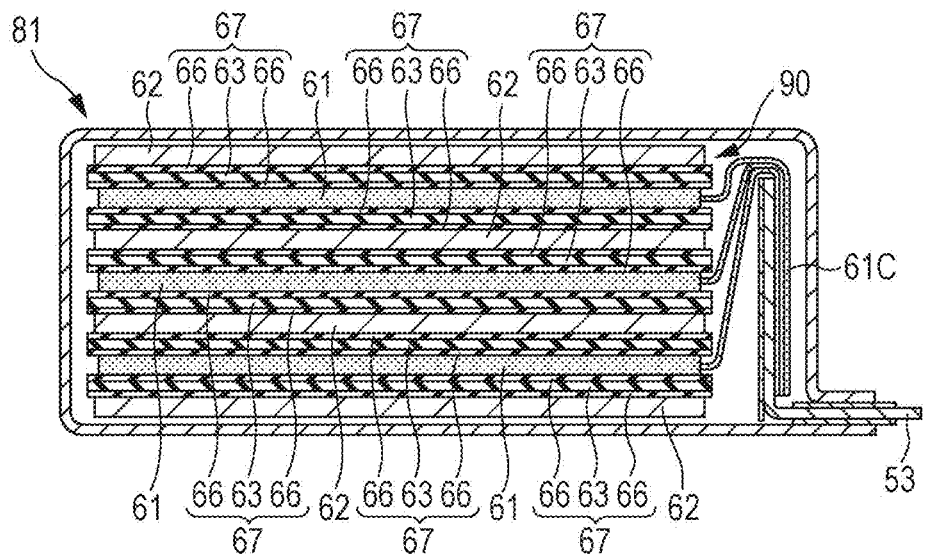
FIG. 14A is a cross-sectional view showing the XIVA-XIVA cross section of the non-aqueous electrolyte battery in FIG. 12A.
Figure 14B:
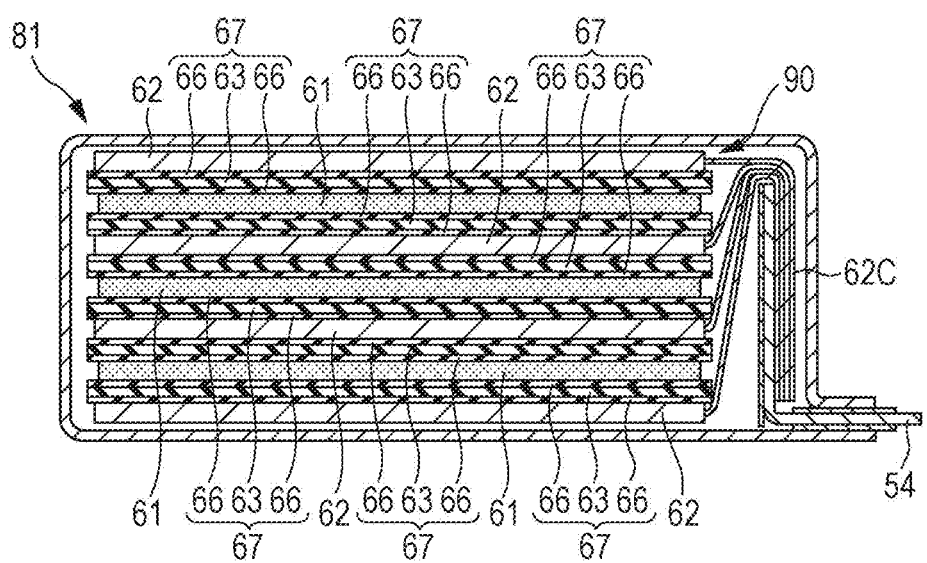
FIG. 14B is a cross-sectional view showing the XIVB-XIVB cross section of the non-aqueous electrolyte battery in FIG. 12A.

FIG. 14A is a cross-sectional view showing the cross section of the non-aqueous electrolyte battery taken along the XIVA-XIVA in FIG. 12A. FIG. 14B is a cross-sectional view showing the cross section of the non-aqueous electrolyte battery taken along the XIVB-XIVB in FIG. 12A. As shown in FIGS. 14A to 14B, in the battery element 60, the electrolytic solution holding layer 66 is formed on both surfaces of the separator 63, and the separator 63 and the positive electrode 61, and the separator 63 and the negative electrode 62 are adhered through the insulating layer 66, respectively. In addition, the positive electrode 61 and the negative electrode 62 are adhered through the insulating layer 67. Provision of the insulating layer 67 between the positive electrode 61 and the negative electrode 62 increases the adhesiveness between the positive electrode 61 and the negative electrode 62 so as to suppress the inter-electrode distance from becoming uneven due to repetition of charging and discharging. Meanwhile, the electrolytic solution holding layer 66 may be formed on only one surface of the separator 63.

The positive electrode tab 61C as the positive electrode terminal that is electrically connected to plural sheets of the positive electrode 61 respectively and the negative electrode tab 62C as the negative electrode terminal that is electrically connected to plural sheets of the negative electrode 62 respectively are pulled out from the battery element 90. The positive electrode lead 53 and the negative electrode lead 54 are connected to plural sheets of the positive electrode tabs 61C and negative electrode tabs 62C, respectively, by resistance welding, ultrasonic welding, or the like. Furthermore, the positive electrode tabs 61C and the negative electrode tabs 62C, which are stacked in plural sheets, are configured so that the cross section becomes an approximately U shape. The positive electrode tabs 61C and the negative electrode tabs 62C are folded into a U shape in a state of having an appropriate slack at the folded portion.

(Method of Manufacturing the Non-Aqueous Electrolyte Battery)

The non-aqueous electrolyte battery 81 can be manufactured by, for example, the following process.

(Formation of the Positive Electrode, the Negative Electrode, and the Porous Polymer Compound)

The positive electrode 61 and the negative electrode 62 can be manufactured by the same method as in the second embodiment. In addition, the porous polymer compound is formed on the surface of the separator 63 by the same method as in the second embodiment.

(Laminating Process)

Next, as shown in FIGS. 13A and 13B, the predetermined number of the positive electrodes 61 and the negative electrodes 62 are laminated through the rectangular separator 63 so that, for example, the negative electrode 62, the separator 63, the positive electrode 61, the separator 63, . . . , the separator 63, and the negative electrode 62 are stacked. Subsequently, the positive electrode 61, the negative electrode 62, and the separator 63 are fixed in a pressed state so as to be closely adhered, thereby manufacturing the battery element 90.

The battery element 90 manufactured in the above manner has the positive electrode tabs 61C and the negative electrode tabs 62C folded like a U shaped by the same method as in the second embodiment.

(Covering Process)

After that, the manufactured battery element 90 is covered with the laminate film 52, and one of the side portions, the top portion, and the bottom portion are heated using the heater head and thermally fused. The top portion and the bottom portion, through which the positive electrode lead 53 and the negative electrode lead 54 are drawn out, are heated using, for example, a heater head having a notch, and thermally fused.

Subsequently, an electrolytic solution is injected through an opening in the other side portion that is not thermally fused. Finally, the laminate film 52 in the side portion through which the electrolytic solution is injected is thermally fused, and the battery element 90 is sealed in the laminate film 52. After that, heat pressing in which the battery element 90 is pressurized and heated from the outside of the laminate film 52 is carried out, and the electrolytic solution is held in the porous polymer compound. Thereby, the electrolytic solution holding layer 66 is formed. During the hot press, the porous polymer compound swells in the electrolytic solution holding layer 66, but the pore structure of the porous polymer compound is not collapsed, and the pores are maintained. Thereby, the non-aqueous electrolyte battery 81 is completed.

4. Fourth Embodiment (Example of the Battery Pack)

Figure 15:
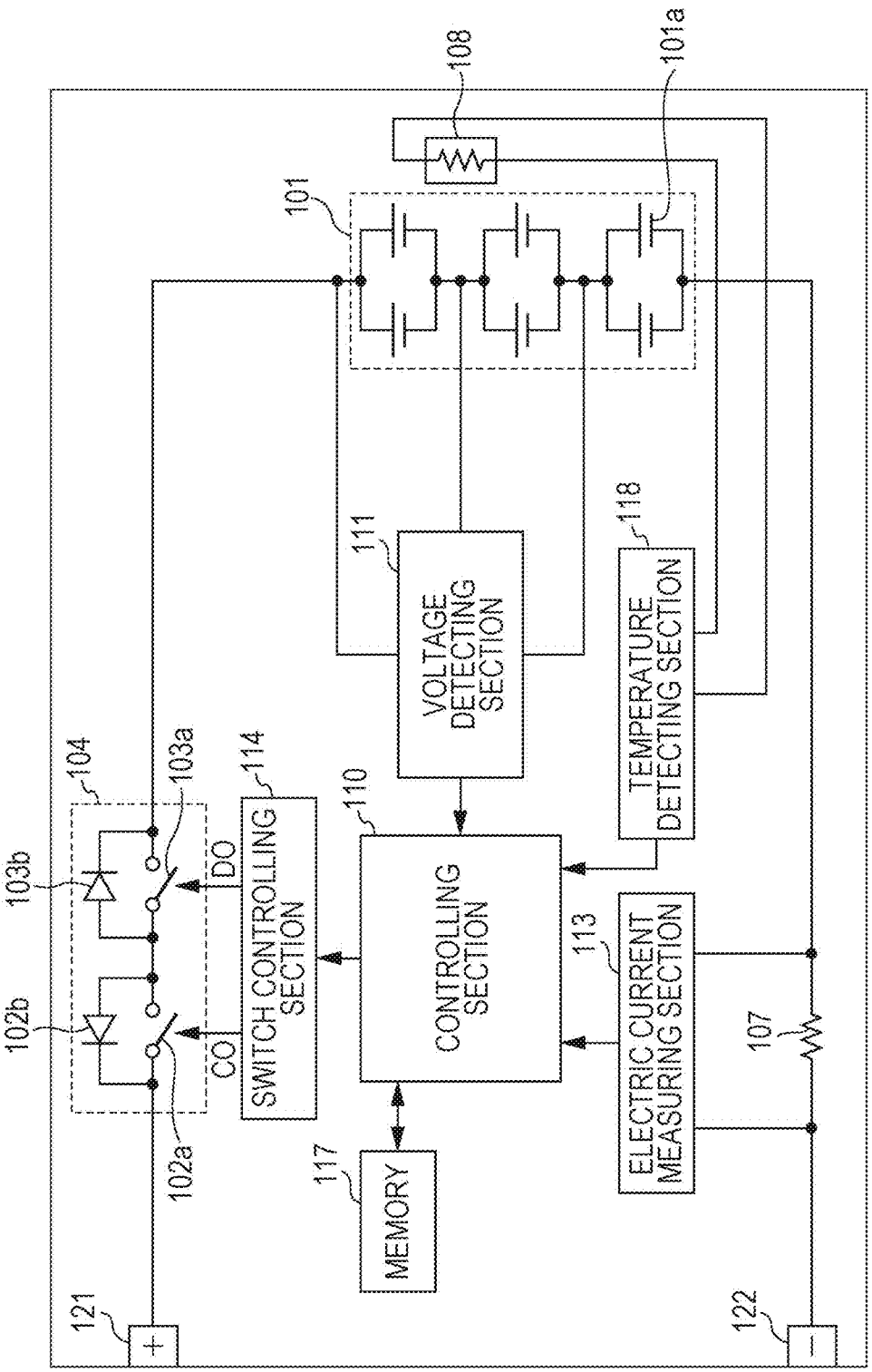
FIG. 15 is a block diagram showing an example of the configuration of the battery pack according to the embodiment of the technology.

FIG. 15 is a block diagram showing an example of the circuit configuration when the non-aqueous electrolyte battery of the technology (hereinafter referred to appropriately as the secondary battery) is applied to a battery pack. The battery pack has an assembled battery 101, an exterior, a switch section 104 having a charge control switch 102a and a discharge control switch 103a, an electric current detecting resistance 107, a temperature detecting element 108, and a controlling section 110.

In addition, the battery pack has a positive electrode terminal 121 and a negative electrode terminal 122, and, during charging, the positive electrode terminal 121 and the negative electrode terminal 122 are connected to the positive electrode terminal and negative electrode terminal in a charger, respectively, so that charging is carried out. In addition, during use of an electronic device, the positive electrode terminal 121 and the negative electrode terminal 122 are connected to the positive electrode terminal and negative electrode terminal in the electronic device, respectively, so that discharging is carried out.

The assembled battery 101 is connected to a plurality of secondary batteries 101a in series and/or in parallel. The secondary battery 101a is the secondary battery of the technology. Meanwhile, FIG. 15 shows a case in which six secondary batteries 101a are connected (two batteries in parallel, three batteries in series (2P3S)) as an example, but may be connected by any connecting method, such as n batteries in parallel and m batteries in series (n and m are integers).

The switch section 104 has the charge control switch 102a, a diode 102b, the discharge control switch 103a, and a diode 103b, and is controlled by the controlling section 110. The diode 102b has a polarity that is reverse for charging electric currents which flow in a direction from the positive electrode terminal 121 to the assembled battery 101 and is forward for discharging electric currents which flow in a direction from the negative electrode terminal 122 to the assembled battery 101. The diode 103b has a polarity that is forward for the charging electric currents and is reverse for the discharging electric currents. Furthermore, the switch section is provided on the positive side in the example, but may be provided on the negative side.

The charge control switch 102a is controlled by a charge and discharge section so that the charge control switch is turned off when the battery voltage becomes an overcharge detecting voltage so as to prevent charging electric currents from flowing through the electric current passage of the assembled battery 101. After the charge control switch is turned off, only discharging through the diode 102b becomes possible. In addition, the charge control switch is controlled by the controlling section 110 so that the charge control switch is turned off when a large electric current flows during charging so as to block charging electric currents which flow through the electric current passage of the assembled battery 101.

The discharge control switch 103a is controlled by the controlling section 110 so that the discharge control switch is turned off when the battery voltage becomes an over-discharge detecting voltage so as to prevent discharge electric currents from flowing through the electric current passage of the assembled battery 101. After the discharge control switch 103a is turned off, only charging through the diode 103b becomes possible. In addition, the discharge control switch 103a is controlled by the controlling section 110 so that the discharge control switch is turned off when a large electric current flows during discharging so as to block discharge electric currents which flow through the electric current passage of the assembled battery 101.

The temperature detecting element 108 is, for example, a thermistor, provided in the vicinity of the assembled battery 101, and measures the temperature of the assembled battery 101 so as to supply the measured temperature to the controlling section 110. The voltage detecting section 111 measures the voltages of the assembled battery 101 and the respective secondary batteries 101a which compose the assembled battery, A/D converts the measured voltages, and supplies the voltages to the controlling section 110. The electric current measuring section 113 measures an electric current using the electric current detecting resistance 107, and supplies the measured electric current to the controlling section 110.

The switch controlling section 114 controls the charge control switch 102a and the discharge control switch 103a in the switch section 104 based on voltages and electric currents entered from the voltage detecting section 111 and the electric current measuring section 113. The switch controlling section 114 sends a control signal to the switch section 104 when the voltage of any of the secondary batteries 101a becomes the overcharge detecting voltage or the over-discharge detecting voltage or less, or a large electric current abruptly flows so as to prevent overcharging, over discharging, and over electric current charging and discharging.

Here, for example, when the secondary battery is a lithium ion secondary battery, the overcharge detecting voltage is specified as, for example, 4.20 V±0.05 V, and the over discharge detecting voltage is specified as, for example 2.4 V±0.1 V.

As the charge and discharge switch, for example, a semiconductor switch, such as a MOSFET, can be used. In this case, the body diode of the MOSFET functions as the diode 102b and the diode 103b. When a P channel-type FET is used as the charge and discharge switch, the switch controlling section 114 supplies control signals DO and CO, respectively, to the respective gates of the charge control switch 102a and the discharge control switch 103a. When the charge control switch 102a and the discharge control switch 103a are p channel-type, the charge control switch 102a and the discharge control switch 103a are turned on by a gate potential that is a predetermined value or more lower than the source potential. That is, in an ordinary charge and discharge operation, the control signals CO and DO are set to low levels, and the charge control switch 102a and the discharge control switch 103a are set to the ON state.

In addition, for example, in the case of overcharge and over discharge, the control signals CO and DO are set to high levels, and the charge control switch 102a and the discharge control switch 103a are set to the OFF state.

A memory 117 is composed of a RAM or ROM, and is composed of, for example, an erasable programmable read only memory (EPROM) or the like, which is a nonvolatile memory. In the memory 117, numeric values computed by the controlling section 110, the internal resistance values of the batteries in the initial states of the respective secondary batteries 101a, which are measured at the steps of the manufacturing process, and the like are stored in advance, and, appropriately, information alteration is also possible. In addition, storing the fully charge capacities of the secondary batteries 101a allows the computation of, for example, the remaining power in association with the controlling section 110.

The temperature detecting section 118 measures the temperature using the temperature detecting element 108, controls charge and discharge in case of abnormal heat generation, and corrects the computation of the remaining power.

5. Fifth Embodiment

The above non-aqueous electrolyte battery and the battery pack using the same can be mounted on a device, such as an electronic device, an electromotive vehicle, and a power storage apparatus, and used to supply electric power.

Examples of the electronic device include a notebook-type personal computer, a personal digital assistant (PDA), a mobile phone, a cordless phone handset, a video movie, a digital still camera, an electronic book, an electronic dictionary, a music player, a radio, a headphone, a game player, a navigation system, a memory card, a pacemaker, an acoustic aid, an electromotive tool, an electric absorber, a refrigerator, an air conditioner, a television, a stereo, a water heater, a microwave, a dish washer, a washing machine, a drying machine, a lighting device, a toy, a medical device, a robot, a load conditioner, a traffic light, and the like.

In addition, the electromotive vehicle includes a railway vehicle, a golf cart, an electromotive cart, an electric vehicle (including a hybrid vehicle), and the like, and can be used as the driving power supply or auxiliary power supply of the above.

The power storage apparatus includes power sources for electric power storage for constructions beginning with houses and power generation facilities, and the like.

Hereinafter, among the above applications, a specific example of a power storage system in which a power storage apparatus to which the non-aqueous electrolyte battery of the technology is applied is used will be described.

The power storage system has, for example, the following configuration. A first power storage system is a power storage system in which a power storage apparatus is charged by a power generation apparatus in which power generation is carried out from renewable energy. A second power storage system is a power storage system that has a power storage apparatus and supplies electric power to an electronic device connected to the power storage apparatus. A third power storage system is an electronic device that receives the supply of electric power from a power storage apparatus. These power storage systems are embodied as systems for supplying electric power efficiently in cooperation with an external power supply network.

Furthermore, a fourth power storage system is an electromotive vehicle having a converting apparatus that receives the supply of electric power from a power storage apparatus and converts the electric power to the driving force of a vehicle and a control apparatus that carries out information processing concerning the vehicle control based on information concerning the power storage apparatus. A fifth power storage system is an electric power system that has an electric power information sending and receiving section that sends and receives signals with other devices through a network and carries out the charge and discharge control of the above power storage apparatus based on information received by the sending and receiving unit. A sixth power storage system is an electric power system that receives the supply of electric power from the above power storage apparatus or supplies electric power to a power storage apparatus from a power generation apparatus or an electric power network. Hereinafter, the power storage system will be described.

(5-1) Power Storage System in a House as an Application

Figure 16:
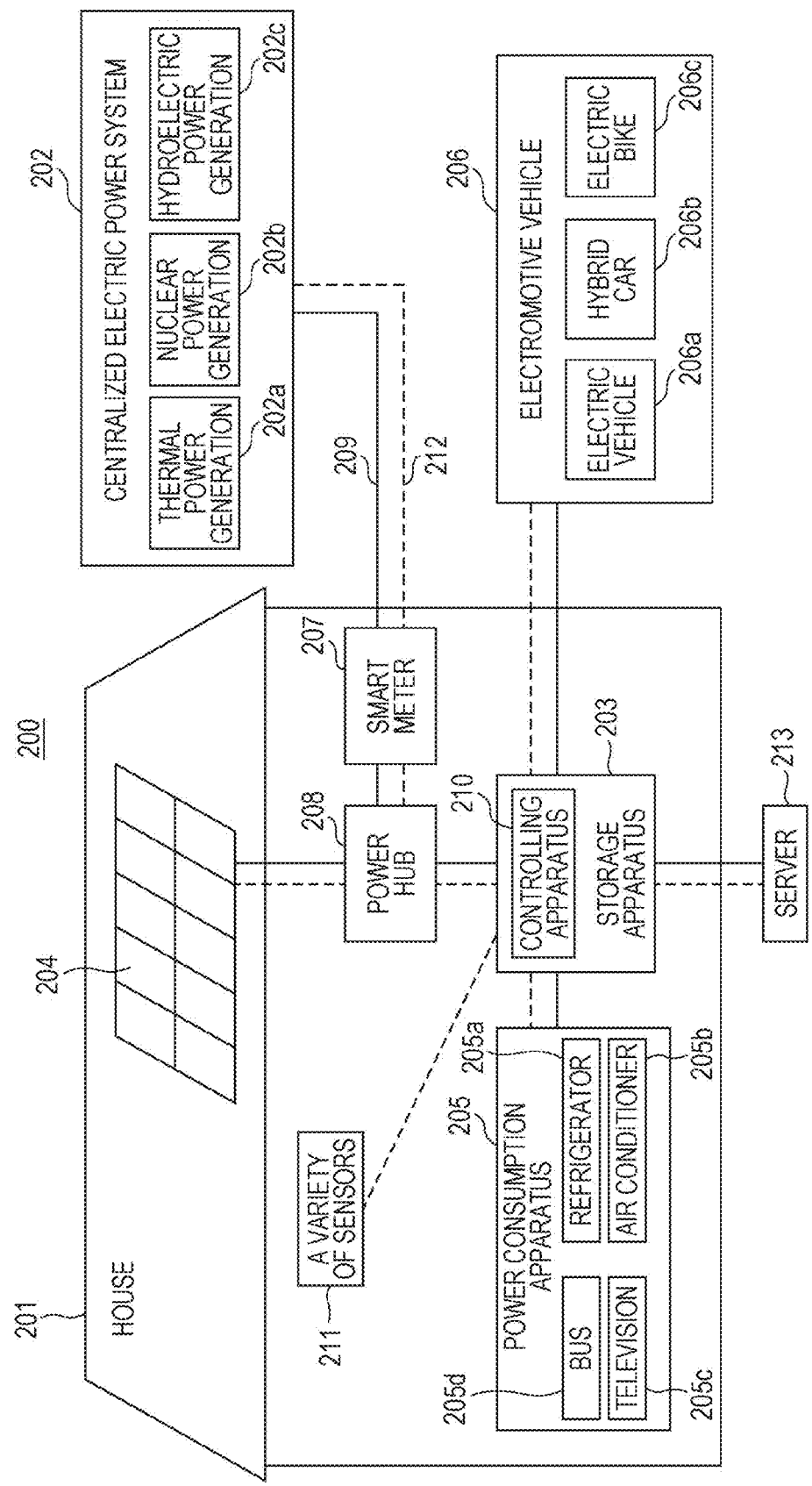
FIG. 16 is a schematic view showing an example in which the non-aqueous electrolyte battery of the technology is applied to a house power storage system.

An example in which a power storage apparatus in which the non-aqueous electrolyte battery of the technology is used is applied to a power storage system for a house will be described with reference to FIG. 16. For example, in a power storage system 200 for a house 201, electric power is supplied to a power storage apparatus 203 from a centralized electric power system 202, such as thermal power generation 202a, nuclear power generation 202b, or hydroelectric power generation 202c, through an electric power network 209, an information network 212, a smart meter 207, a power hub 208, or the like. Together with the above, electric power is supplied to the power storage apparatus 203 from an independent power source, such as an in-house power generation apparatus 204. The supplied electric power is stored in the power storage apparatus 203. Electric power used in the house 201 is supplied using the power storage apparatus 203. The same power storage system can be used not only for the house 201 but also for buildings.

The house 201 is provided with the power generation apparatus 204, a power consumption apparatus 205, the power storage apparatus 203, a control apparatus that controls the respective apparatuses 210, the smart meter 207, and a sensor 211 that obtains a variety of information. The respective apparatuses are connected to each other by the electric power network 209 and the information network 212. A solar cell, a fuel cell, or the like is used as the power generation apparatus 204, and the generated electric power is supplied to the power consumption apparatus 205 and/or the power storage apparatus 203. The power consumption apparatus 205 is a refrigerator 205a, an air conditioner 205b, a television receiver 205c, a bath 205d, or the like. Furthermore, the power consumption apparatus 205 includes the electromotive vehicle 206. The electromotive vehicle 206 is an electric vehicle 206a, a hybrid car 206b, and an electric bike 206c.

The non-aqueous electrolyte battery is applied to the power storage apparatus 203. The non-aqueous electrolyte battery of the technology may be composed of, for example, the above lithium ion secondary battery. The smart meter 207 has functions of measuring the used amount of commercial electric power and sending the measured used amount to an electric power company. The electric power network 209 may be any of direct current power supply, alternative current power supply, and non-contact power supply, or a combination of a plurality thereof.

Examples of the variety of sensors 211 include a motion sensor, an illumination sensor, an object-detecting sensor, a power consumption sensor, a vibration sensor, a contact sensor, a temperature sensor, an infrared sensor, and the like. Information obtained by the variety of sensor 211 is sent to the control apparatus 210. The state of weather, the state of a person, and the like can be grasped from the information from the sensor 211, and the power consumption apparatus 205 is automatically controlled so that the energy consumption can be minimized. Furthermore, the control apparatus 210 can send information concerning the house 201 to an external electric power company or the like through the internet.

The power hub 208 allows treatments, such as branching of electric power lines, direct current-alternative current conversion, and the like. The communication method of the information network 212 connected to the control apparatus 210 includes a method in which a communication interface, such as universal asynchronous receiver-transceiver (UART), is used, and a method in which a sensor network according to the wireless communication standards, such as Bluetooth, ZigBee, and Wi-Fi, is used. The Bluetooth method can be applied to multimedia communication so as to carry out one to multi communication. In ZigBee, a physical layer of the Institute of Electrical and Electronics Engineers (IEEE) 802.15.4 is used. The IEEE 802.15.4 is the title of the short-distance wireless network standard called a personal area network (PAN) or a wireless PAN.

The control apparatus 210 is connected to an external server 213. The server 213 may be managed by any of the house 201, an electric power company, and a service provider. The information sent by the server 213 is, for example, power consumption information, life pattern information, electric power fees, weather information, natural disaster information, or information concerning electricity transactions. This information may be sent and received by a power consumption apparatus in a house (for example, a television receiver), but also may be sent and received by an apparatus in a house (for example, a mobile phone or the like). This information may be displayed on a device having a display function, such as a television receiver, a mobile phone, and a personal digital assistant (PDA).

The control apparatus 210 that controls the respective units is composed of a central processing unit (CPU), a random access memory (RAM), a read only memory (ROM), and the like, and is accommodated in the power storage apparatus 203 in this example. The control apparatus 210 is connected to the power storage apparatus 203, the in-house power generation apparatus 204, the power consumption apparatus 205, the variety of sensors 211, and the server 213 by the information network 212, and has functions of adjusting the used amount of commercial electric power and the power generation amount. Meanwhile, in addition to those functions, the control apparatus 210 may have a function of carrying out electricity transactions in an electric power market, and the like.

As described above, it is possible to store electric power generated by the in-house power generation apparatus 204 (solar photovoltaic power generation and wind power generation) as well as electric power generated by the centralized electric power system 202, such as thermal power generation 202a, nuclear power generation 202b, or hydroelectric power generation 202c, in the power storage apparatus 203. Therefore, even when the electric power generated by the in-house power generation apparatus 204 varies, it is possible to carry out the control of keeping the amount of electric power sent outside constant or discharging as much as necessary. For example, the power storage system can be used not only to store electric power obtained by solar photovoltaic power generation in the power storage apparatus 203, but also to store nighttime electric power for which the fees are cheap in the power storage apparatus 203 during the nighttime and discharge the electric power stored by the power storage apparatus 203 during daytime in which the fees are expensive.

Meanwhile, this example describes an example in which the control apparatus 210 is accommodated in the power storage apparatus 203, but the control apparatus 210 may be accommodated in the smart meter 207 or configured singly. Furthermore, the power storage system 200 may be used for a plurality of houses in a housing complex, or used for a plurality of detached houses.

(5-2) Power Storage System in a Vehicle as an Application

Figure 17:
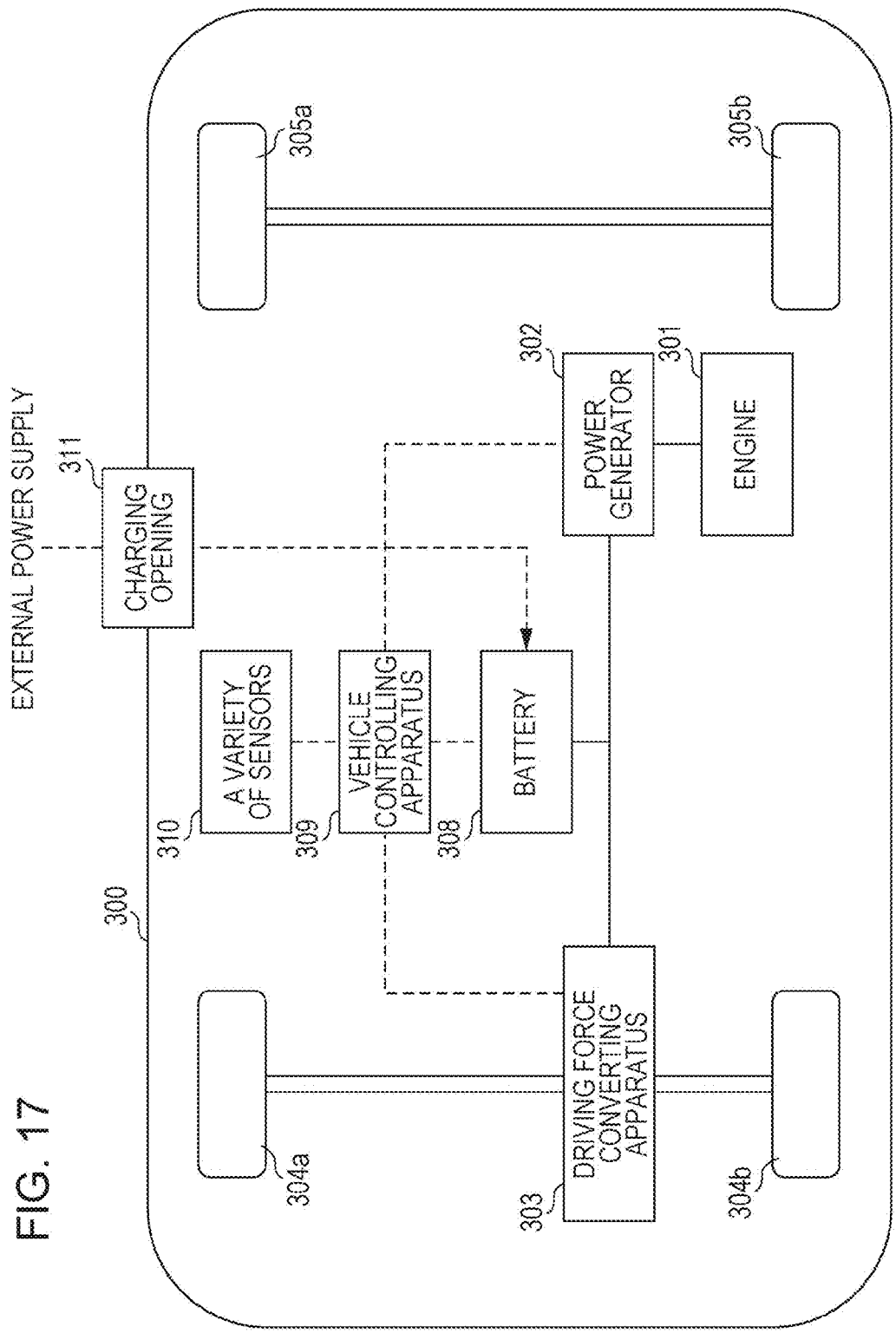
FIG. 17 is a schematic view schematically showing an example of the configuration of a hybrid vehicle in which a series hybrid system to which the technology is applied is employed.

An example in which the technology is applied to a power storage system for vehicle will be described with reference to FIG. 17. FIG. 17 schematically shows an example of the configuration of a hybrid vehicle in which a series hybrid system to which the technology is applied is employed. The series hybrid system is a vehicle that uses electric power generated by a power generator which is operated by an engine or electric power temporarily stored in a battery so as to run an electric power to driving force converting apparatus.

The hybrid vehicle 300 includes an engine 301, a power generator 302, an electric power to driving force converting apparatus 303, a driving wheel 304a, a driving wheel 304b, a wheel 305a, a wheel 305b, a battery 308, a vehicle controlling apparatus 309, a variety of sensors 310, and a charging opening 311. The non-aqueous electrolyte battery of the technology is applied to the battery 308.

The hybrid vehicle 300 runs using the electric power to driving force converting apparatus 303 as a power source. An example of the electric power to driving force converting apparatus 303 is a motor. The electric power to driving force converting apparatus 303 is operated by the electric power of the battery 308, and a rotative force of the electric power to driving force converting apparatus 303 is transmitted to the driving wheels 304a and 304b. Meanwhile, use of direct current to alternative current (DC-AC) conversion or alternative current to direct current (AC-DC) conversion allows the application of the electric power to driving force converting apparatus 303 to both an alternative current motor and a direct current motor. The variety of sensors 310 controls the rotation number of the engine through the vehicle controlling apparatus 309 or controls the opening of a throttle valve (throttle valve). The variety of sensors 310 includes a speed sensor, an acceleration sensor, an engine rotation number sensor, and the like.

The rotative force of the engine 301 is transmitted to the power generator 302, and electric power generated by the power generator 302 can be stored in the battery 308 due to the rotative force.

When the hybrid vehicle 300 is decelerated by a damping mechanism, not shown, the resistive force generated during the deceleration is added to the electric power to driving force converting apparatus 303 as a rotative force, and the regenerative electric power generated by the electric power to driving force converting apparatus 303 is stored in the battery 308 due to the rotative force.

When the battery 308 is connected to an external power source of the hybrid vehicle 300, the battery can receive the supply of electric power from the external power source through the charging opening 311 as an entering opening, and store the received electric power.

Although not shown, the hybrid vehicle may have an information processing apparatus that carries out information processing concerning vehicle control based on information concerning the secondary battery. Examples of the information processing apparatus include an information processing apparatus that displays the remaining amount of the battery based on information concerning the remaining amount of the battery.

Meanwhile, in the above, an example of a series hybrid vehicle is described that uses electric power generated by the power generator which is operated by the engine or electric power temporarily stored in the battery so as to run by the motor. However, the technology can be effectively applied to a parallel hybrid vehicle that appropriately switches and uses three methods in which any of the engine and the motor is used as a driving source, and the vehicle runs by only the engine, only the motor, and the engine and the motor. Furthermore, the technology can also be effectively applied to a so-called electromotive vehicle that does not use an engine and runs by the driving only of the driving motor.

EXAMPLES

Hereinafter, the technology will be described specifically using examples, but the technology is not limited only to the examples. Meanwhile, the weight average molecular weight and degree of swelling of a polymer material used in the following samples were measured in the following manner.

(Measurement of the Weight Average Molecular Weight)

The weight average molecular weight of the polymer material was measured by the following method. Gel permeation chromatography (GPC) manufactured by Showa Denko K.K. (product name: Shodex GPC-101) was used, in which Shodex RI-71S (product name) manufactured by Showa Denko K.K., N-methyl-2-pyrrolidone (NMP), and Shodex GPC KD-860M (product name) manufactured by Showa Denko K.K. were used as a detector, an eluent, and a packed column, respectively. A calibration curve, in which the correlation between the detecting duration and the molecular weight was obtained using standard polystyrene, was obtained in advance, and the measurement of the polymer material was carried out under the same conditions, thereby obtaining a polystyrene-converted weight average relative molecular weight.

(Test of the Degree of Swelling)

The polymer material was dissolved in N-methyl-2-pyrrolidone, coated on a glass substrate using a coater, left to stand at 90° C. for one hour, dried by heating at 60° C. under a vacuum for 24 hours or more, and the N-methyl-2-pyrrolidone was removed, thereby obtaining a single film. The obtained film was punched into a disk shape of 20 mmφ, immersed in a solvent of 60° C. for 24 hours, and the degree of swelling, or {[volume after immersion]/[volume before immersion]}×100 (%), was obtained from the change in the volume before and after the immersion.

<Sample 1-1>

A laminate-type battery shown in FIGS. 1 and 2 was manufactured in the following manner.

(Manufacturing of the Positive Electrode)

85 parts by mass of lithium cobaltate ($LiCoO_2$), 5 parts by mass of graphite, which is a conducting agent, and 10 parts by mass of polyvinylidene fluoride, which is a bonding agent, were mixed so as to prepare a positive electrode compound, and, furthermore, the positive electrode compound was dispersed in N-methyl-2-pyrrolidone, which is a dispersion medium, so as to produce a positive electrode compound slurry.

Subsequently, the positive electrode compound slurry was evenly coated and dried on both surfaces of the positive electrode collector 33A composed of a 20 μm-thick aluminum foil, and then compacted using a roll press machine so as to form the positive electrode active material layer 33B, thereby manufacturing the positive electrode 33. After that, the positive electrode lead 31 was attached to the positive electrode 33.

(Manufacturing of the Negative Electrode)

Crushed graphite powder was prepared as a negative electrode active material, 90 parts by mass of the graphite powder and 10 parts by mass of polyvinylidene fluoride, which is a bonding agent, was mixed so as to prepare a negative electrode compound, and, furthermore, the negative electrode compound was dispersed in N-methyl-2-pyrrolidone, which was a dispersion medium, so as to produce a negative electrode compound slurry.

Next, the negative electrode compound slurry was evenly coated and dried on both surfaces of the negative electrode collector 34A composed of a 15 μm-thick copper foil, and then compacted using a roll press machine so as to form the negative electrode active material layer 34B, thereby manufacturing the negative electrode 34. At that time, the ratio of the capacity of the positive electrode 33 with respect to the capacity of the negative electrode 34 was set to 1.1. Subsequently, the negative electrode lead 32 was attached to the negative electrode 34.

(Manufacturing of the Porous Polymer Compound)

A polymer material was dissolved in N-methyl-2-pyrrolidone so as to prepare a solution. The solution was coated on both surfaces of the separator 35, immersed in water, and then dried. Thereby, a porous polymer compound having a porous structure was formed on both surfaces of the separator 35. A polyethylene microporous film (air permeability of 200 seconds/100 cc) was used as the separator 35.

The following vinylidene fluoride polymer was used as the polymer material.

Polymer material: vinylidene fluoride—hexafluoropropylene copolymer

Mass composition ratio (vinylidene fluoride monomer unit:hexafluoropropylene monomer unit)=97:7

Weight average molecular weight: 350,000

The positive electrode 33 and the negative electrode 34 were closely adhered through the separator 35 having the porous polymer compound formed on both surfaces, then wound in the longitudinal direction, and the protective tape 37 was attached to the outermost circumference, thereby manufacturing the wound electrode body 30.

The wound electrode body 30 was interposed in the exterior member 40, and three sides were thermally fused. Meanwhile, a damp-proof aluminum laminate film having a structure in which a 25 μm-thick nylon film, a 40 μm-thick aluminum foil, and a 30 μm-thick polypropylene film were laminated sequentially from the outermost layer was used as the exterior member 40.

After that, an electrolytic solution was injected into the exterior member so that the amount of the electrolytic solution in the cell became 1.85 g, and the remaining side was thermally fused under a reduced pressure, whereby the exterior member was sealed. A solution of lithium hexafluorophosphate ($LiPF_6$) dissolved in a mixed solvent of ethylene carbonate (EC) and diethyl carbonate (DEC) at a concentration of 1.2 mol/l was used as the electrolytic solution. In addition, the exterior member was interposed between iron plates and heated at 100° C. for 3 minutes so that the positive electrode 33, the negative electrode 34, and the separator 35 were adhered through the electrolytic solution holding layer 36. Thereby, a laminate film-type battery having a size of 4×35×50 mm (7 $cm^3$) as shown in FIGS. 1 and 2 was obtained.

<Sample 1-2>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=97:3

Weight average molecular weight: 500,000

The laminate film-type battery of Sample 1-2 was manufactured in the same manner as in Sample 1-1 except the above.

<Sample 1-3>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=97:3

Weight average molecular weight: 750,000

The laminate film-type battery of Sample 1-3 was manufactured in the same manner as in Sample 1-1 except the above.

<Sample 1-4>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=97:3

Weight average molecular weight: one million

The laminate film-type battery of Sample 1-4 was manufactured in the same manner as in Sample 1-1 except the above.

<Sample 1-5>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=95:5

Weight average molecular weight: 350,000

The laminate film-type battery of Sample 1-5 was manufactured in the same manner as in Sample 1-1 except the above.

<Sample 1-6>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=95:5

Weight average molecular weight: 500,000

The laminate film-type battery of Sample 1-6 was manufactured in the same manner as in Sample 1-1 except the above.

<Sample 1-7>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=95:5

Weight average molecular weight: 750,000

The laminate film-type battery of Sample 1-7 was manufactured in the same manner as in Sample 1-1 except the above.

<Sample 1-8>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=95:5

Weight average molecular weight: one million

The laminate film-type battery of Sample 1-8 was manufactured in the same manner as in Sample 1-1 except the above.

<Sample 1-9>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=93:7

Weight average molecular weight: 350,000

The laminate film-type battery of Sample 1-9 was manufactured in the same manner as in Sample 1-1 except the above.

<Sample 1-10>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=93:7

Weight average molecular weight: 500,000

The laminate film-type battery of Sample 1-10 was manufactured in the same manner as in Sample 1-1 except the above.

<Sample 1-11>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=93:7

Weight average molecular weight: 750,000

The laminate film-type battery of Sample 1-11 was manufactured in the same manner as in Sample 1-1 except the above.

<Sample 1-12>

The following vinylidene fluoride polymer was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=93:7

Weight average molecular weight: one million

The laminate film-type battery of Sample 1-12 was manufactured in the same manner as in Sample 1-1 except the above.

<Sample 1-13>

The following vinylidene fluoride polymer was used as the polymer material when the porous polymer compound was manufactured.

Polymer material: vinylidene fluoride homopolymer

Mass composition ratio (vinylidene fluoride monomer unit:hexafluoropropylene monomer unit)=100:0

Weight average molecular weight: 350,000

The laminate film-type battery of Sample 1-13 was manufactured in the same manner as in Sample 1-1 except the above.

<Sample 1-14>

The following vinylidene fluoride polymer was used as the polymer material when the porous polymer compound was manufactured.

Polymer material: vinylidene fluoride homopolymer

Mass composition ratio (vinylidene fluoride monomer unit:hexafluoropropylene monomer unit)=100:0

Weight average molecular weight: 500,000

The laminate film-type battery of Sample 1-14 was manufactured in the same manner as in Sample 1-1 except the above.

<Sample 1-15>

The following vinylidene fluoride polymer was used as the polymer material when the porous polymer compound was manufactured.

Polymer material: vinylidene fluoride homopolymer

Mass composition ratio (vinylidene fluoride monomer unit:hexafluoropropylene monomer unit)=100:0

Weight average molecular weight: 750,000

The laminate film-type battery of Sample 1-15 was manufactured in the same manner as in Sample 1-1 except the above.

<Sample 1-16>

The following vinylidene fluoride polymer was used as the polymer material when the porous polymer compound was manufactured.

Polymer material: vinylidene fluoride homopolymer

Mass composition ratio (vinylidene fluoride monomer unit:hexafluoropropylene monomer unit)=100:0

Weight average molecular weight: one million

The laminate film-type battery of Sample 1-16 was manufactured in the same manner as in Sample 1-1 except the above.

(Evaluation)

The following evaluations were carried out on the laminate film-type batteries of Sample 1-1 to Sample 1-16.

(Test of the Separation Strength between the Negative Electrode and the Separator)

The laminate film-type batteries of Sample 1-1 to Sample 1-16 were charged and discharged once, disassembled, and the separation strength between the negative electrode and the separator was measured at a rate of 100 mm/minute in a tension test.

(Measurement of the Air Permeability of the Porous Polymer Compound before Heat Pressing and after Heat Pressing)

The air resistance (air permeability) was measured using a Gurley-type air permeability meter according to JIS P-817. The measured film area was 6.45 cm$^2$, the permeated air amount was set to 100 cc, and the duration at that time was used as the air permeability (second/100 cc).

(Measurement of the Capacity Retention Rate after 300 Cycles)

Firstly, on each of the batteries, under conditions of 25° C., constant current constant voltage charging of 500 mA was carried out until an upper limit voltage of 4.2 V and 3 hours, and then constant current discharging of 160 mA was carried out until a final voltage of 3 V.

Next, constant current charging of 1000 mA was carried out until an upper limit voltage of 4.2 V, and then constant voltage charging was carried out until the cutoff current became 50 mA or until the duration of constant voltage charging reached 3 hours. Constant current discharging of 800 mA was carried out until a final voltage of 3 V, and the discharge capacity at this time was measured and used as the discharge capacity at the first cycle.

After that, charging and discharging were repeated 299 times under the same charging and discharging conditions, and the discharge capacity at the 300$^{th}$ cycle was measured. In addition, the discharge capacity at the 300$^{th}$ cycle under an assumption that the discharge capacity at the 1$^{st}$ cycle was 100 was obtained as the capacity retention rate after the 300$^{th}$ cycle, or {discharge capacity at 300$^{th}$ cycle/discharge capacity at 1$^{st}$ cycle}×100(%).

(Observation by a Scanning Electron Microscope (SEM))

Figure 18:
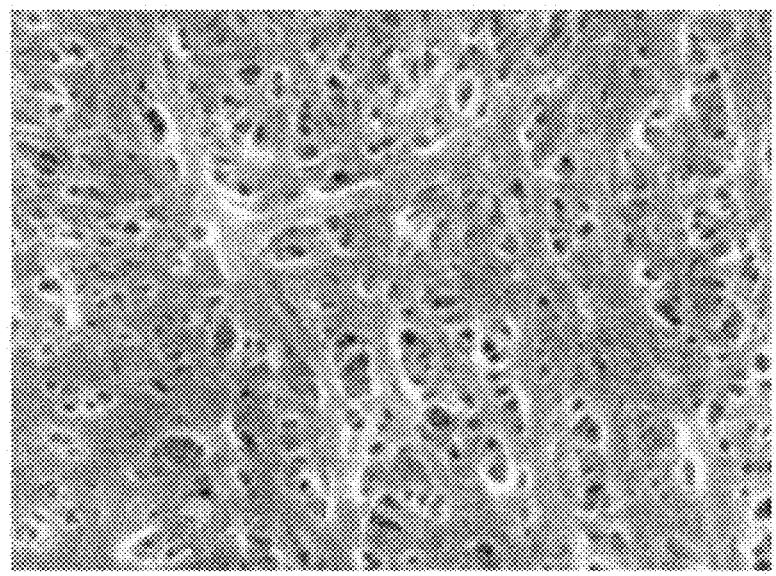
FIG. 18 is a SEM photograph of a portion of the surface of the insulating layer of Sample 1-4 after heat pressing.
Figure 19:
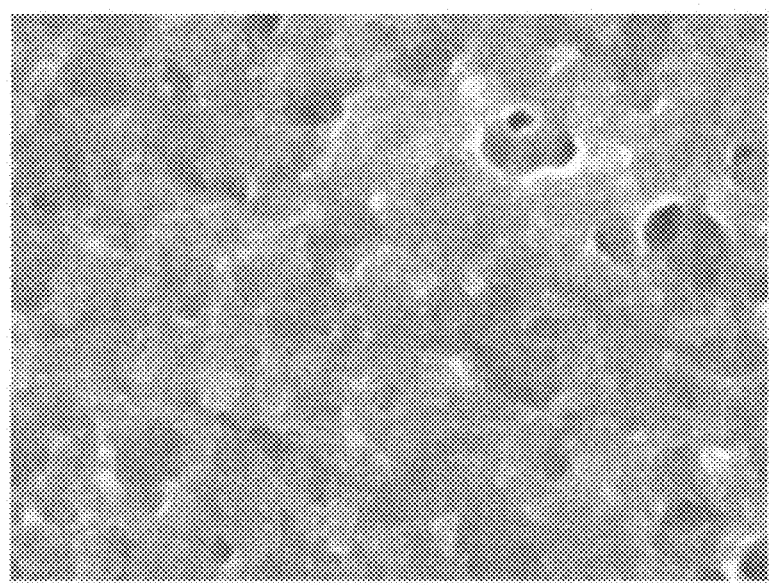
FIG. 19 is a SEM photograph of a portion of the surface of the insulating layer of Sample 1-10 after heat pressing.
Figure 21:
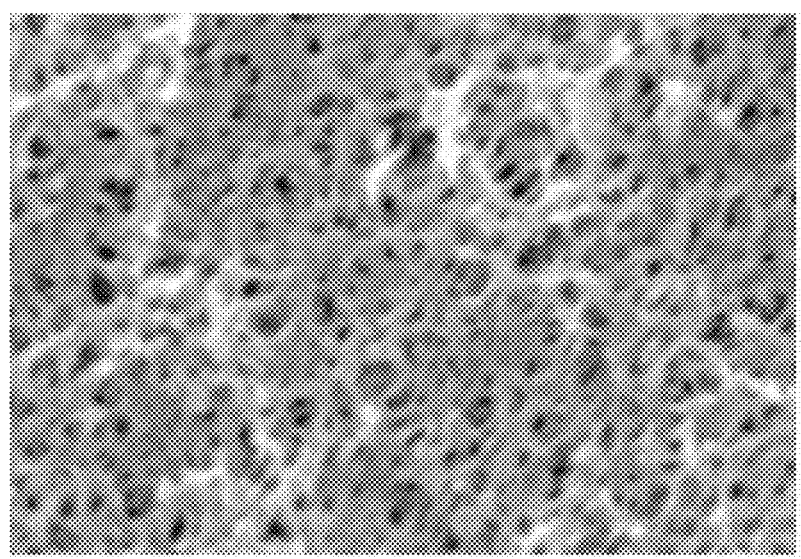
FIG. 21 is a SEM photograph of a portion of the surface of the insulating layer of Sample 1-10 after heat pressing which is different from the portion shown in FIG. 19.

The laminate film-type batteries of Sample 1-4 and Sample 1-10 were disassembled, and the electrolytic solution holding layers 36 formed on the separators 35 were observed using a SEM. The SEM photograph of Sample 1-4 is shown in FIG. 18, and the SEM photograph of Sample 1-10 is shown in FIGS. 19 and 21.

Figure 20:
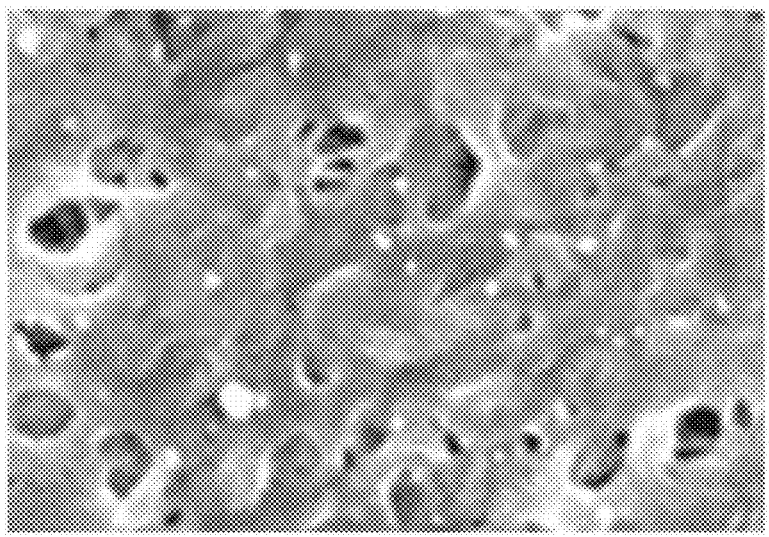
FIG. 20 is a SEM photograph of a portion of the surface of the insulating layer of Sample 1-4 after heat pressing which is different from the portion shown in FIG. 18.

The evaluation results are shown in Table 1.

increased, and the vinylidene fluoride polymer was dissolved in the electrolytic solution, the capacity retention rate after the 300$^{th}$ cycle was also degraded. Meanwhile, like Sample 1-4 shown in FIGS. 18 and 20, when the mass composition ratio of the vinylidene fluoride polymer, or vinylidene fluoride monomer units:hexafluoropropylene monomer units, was within a range of 100:0 to 95:5, the porous polymer compound did not swell excessively, and the pore structure was maintained during heat pressing, and therefore the air permeability was small.

<Sample 2-1>

A laminate film-type battery shown in FIGS. 1 and 2 was manufactured in the following manner.

TABLE 1

| | Vinylidene fluoride polymer | | | Separation strength | Air | Air | Capacity |
| | Weight average | Mass composition ratio | | | between negative | permeability | permeability | retention |
| | molecular weight [ten thousands] | Vinylidene fluoride monomer unit | Hexafluoro-propylene monomer unit | Degree of swelling [%] | electrode and separator [N/m] | before heat pressing [sec/100 cc] | after heat pressing [sec/100 cc] | rate after 300 cycles [%] |
|---|---|---|---|---|---|---|---|---|
| Sample 1-1 | 35 | 97 | 3 | 110 | 5 | 489 | 502 | 70 |
| Sample 1-2 | 50 | | | 106 | 10 | 248 | 277 | 85 |
| Sample 1-3 | 75 | | | 105 | 11 | 242 | 286 | 84 |
| Sample 1-4 | 100 | | | 106 | 13 | 237 | 256 | 86 |
| Sample 1-5 | 35 | 95 | 5 | 121 | 3 | 470 | >10000 | 38 |
| Sample 1-6 | 50 | | | 123 | 12 | 247 | 289 | 80 |
| Sample 1-7 | 75 | | | 122 | 12 | 235 | 298 | 78 |
| Sample 1-8 | 100 | | | 120 | 13 | 229 | 278 | 82 |
| Sample 1-9 | 35 | 93 | 7 | 136 | 4 | 509 | >10000 | 32 |
| Sample 1-10 | 50 | | | 133 | 15 | 247 | 6712 | 39 |
| Sample 1-11 | 75 | | | 133 | 14 | 249 | 6210 | 38 |
| Sample 1-12 | 100 | | | 134 | 15 | 229 | 5400 | 34 |
| Sample 1-13 | 35 | 100 | — | 103 | 5 | 468 | 498 | 71 |
| Sample 1-14 | 50 | | | 102 | 10 | 287 | 289 | 82 |
| Sample 1-15 | 75 | | | 102 | 10 | 268 | 294 | 81 |
| Sample 1-16 | 100 | | | 103 | 10 | 276 | 288 | 81 |

As shown in Table 1, in Sample 1-2 to Sample 1-4, Sample 1-6 to Sample 1-8, and Sample 1-14 to Sample 1-16, the capacity retention rate after the 300$^{th}$ cycle was favorable, and the air permeability of the porous polymer compound after heat pressing was also small.

On the other hand, in Sample 1-1, Sample 1-5, Sample 1-9, and Sample 1-13, since the weight average molecular weight of the polymer compound was smaller than the optimal value, or 500,000, the separation strength between the negative electrode and the separator was degraded, whereby the capacity retention rate after the 300$^{th}$ cycle was degraded. In addition, the air permeability of the porous polymer compound after heat pressing was also slightly large.

In addition, in Sample 1-9 to Sample 1-12, since the mass composition ratio of the vinylidene fluoride polymer, or vinylidene fluoride monomer units:hexafluoropropylene monomer units, was outside a range of 100:0 to 95:5, the air permeability of the porous polymer compound after heat pressing was large. This is because, like Sample 1-10 shown in FIGS. 19 and 21, when the mass composition ratio of the vinylidene fluoride polymer, or vinylidene fluoride monomer units:hexafluoropropylene monomer units, was outside a range of 100:0 to 95:5, the porous polymer compound excessively swelled during heat pressing, and therefore the pore structure was collapsed, and the pores were closed. In addition, in Sample 1-9 to Sample 1-12, since the degree of swelling of the vinylidene fluoride polymer was excessively (Manufacturing of the Positive Electrode, Manufacturing of the Negative Electrode)

The positive electrode 33 and the negative electrode 34 were manufactured in the same manner as in Sample 1-1, the positive electrode lead 31 was attached to the positive electrode 33, and the negative electrode lead 32 was attached to the negative electrode 34.

(Manufacturing of the Porous Polymer Compound)

A solution containing inorganic particles dispersed in N-methyl-2-pyrrolidone was added to a solution containing a polymer material dissolved in N-methyl-2-pyrrolidone so as to prepare a solution. The solution was coated on both surfaces of the separator 35, immersed in water, and then dried. Thereby, a porous polymer compound containing the inorganic particles and having a porous structure was formed on both surfaces of the separator 35. A polyethylene microporous film (air permeability of 200 seconds/100 cc) was used as the separator 35.

The following material was used as the polymer material when the porous polymer compound was manufactured.

Polymer material: vinylidene fluoride—hexafluoropropylene copolymer

Mass composition ratio (vinylidene fluoride monomer unit:hexafluoropropylene monomer unit)=97:3

Weight average molecular weight: one million

The following material was used as the inorganic particles.

Inorganic particles: alumina (average particle diameter of 0.45 μm)

Polymer material: inorganic particles (mass ratio)=1:2

The positive electrode 33 and the negative electrode 34 were closely adhered through the separator 35 having the porous polymer compound containing the inorganic particles formed on both surfaces, then wound in the longitudinal direction, and the protective tape 37 was attached to the outermost circumference, thereby manufacturing the wound electrode body 30.

The wound electrode body 30 was interposed in the exterior member 40, and three sides were thermally fused. Meanwhile, a damp-proof aluminum laminate film having a structure in which a 25 μm-thick nylon film, a 40 μm-thick aluminum foil, and a 30 μm-thick polypropylene film were laminated sequentially from the outermost layer was used as the exterior member 40.

After that, an electrolytic solution was injected into the exterior member so that the amount of the electrolytic solution in the cell became 1.85 g, and the remaining side was thermally fused under a reduced pressure, whereby the exterior member was sealed. A solution of lithium hexafluorophosphate ($LiPF_6$) dissolved in a mixed solvent of ethylene carbonate (EC) and diethyl carbonate (DEC) at a concentration of 1.2 mol/l was used as the electrolytic solution. In addition, the exterior member was interposed between iron plates and heated at 100° C. for 3 minutes so that the positive electrode 33, the negative electrode 34, and the separator 35 were adhered through the electrolytic solution holding layer 36. Thereby, a laminate film-type battery having a size of 4×35×50 mm (7 cm$^3$) as shown in FIGS. 1 and 2 was obtained. The thickness of the electrolytic solution holding layer 36 was adjusted to 3.1 μm, and the area density was adjusted to 0.28 mg/cm$^2$.

Meanwhile, in order to remove the influence of the thickness of the electrolytic solution holding layer 36, for Samples 2-2 to 2-5 as shown below, for which the content ratios of alumina were different from that of Sample 2-1, the area density was adjusted so that the thickness of the electrolytic solution holding layer 36 was set to around 3 μm.

<Sample 2-2>

In the manufacturing of the porous polymer compound, the mass ratio of the polymer material to the inorganic particles was changed to the polymer material:the inorganic particles (mass ratio)=1:4. The thickness of the electrolytic solution holding layer 36 was adjusted to 3.3 μm, and the area density was adjusted to 0.35 mg/cm$^2$. A laminate film-type battery was manufactured in the same manner as in Sample 2-1 except the above.

<Sample 2-3>

In the manufacturing of the porous polymer compound, the mass ratio of the polymer material to the inorganic particles was changed to the polymer material:the inorganic particles (mass ratio)=1:6. The thickness of the electrolytic solution holding layer 36 was adjusted to 2.9 μm, and the area density was adjusted to 0.41 mg/cm$^2$. A laminate film-type battery was manufactured in the same manner as in Sample 2-1 except the above.

<Sample 2-4>

In the manufacturing of the porous polymer compound, the mass ratio of the polymer material to the inorganic particles was changed to the polymer material:the inorganic particles (mass ratio)=1:8. The thickness of the electrolytic solution holding layer 36 was adjusted to 3.0 μm, and the area density was adjusted to 0.45 mg/cm$^2$. A laminate film-type battery was manufactured in the same manner as in Sample 2-1 except the above.

<Sample 2-5>

In the manufacturing of the porous polymer compound, the mass ratio of the polymer material to the inorganic particles was changed to the polymer material:the inorganic particles (mass ratio)=1:10. The thickness of the electrolytic solution holding layer 36 was adjusted to 3.1 μm, and the area density was adjusted to 0.51 mg/cm$^2$. A laminate film-type battery was manufactured in the same manner as in Sample 2-1 except the above.

(Evaluation)

The following evaluation was carried out on the laminate film-type batteries of Sample 2-1 to Sample 2-5. Meanwhile, the float test was also carried out on Sample 1-4 in addition to Sample 2-1 to Sample 2-5.

(Test of the Separation Strength between the Negative Electrode and the Separator) and (Measurement of the Capacity Retention Rate after 300 Cycles)

The test of the separation strength between the negative electrode and the separator and the measurement of the capacity retention rate after 300 cycles were carried out in the same manner as in Sample 1-1.

(Float Test)

In a constant temperature bath set to 60° C., constant current charging was carried out on the laminate film-type battery by a constant current of 1000 mA until the battery voltage reached 4.25 V, and then constant voltage charging was carried out at 4.25 V. At this time, the duration in which the change in the charging current was observed (leaked electric currents occurred) was obtained.

The evaluation results of Sample 2-1 to Sample 2-5 are shown in Table 2. Meanwhile, the evaluation results of (the test of the separation strength between the negative electrode and the separator) and (the measurement of the capacity retention rate after 300 cycles) of Sample 1-4 shown in Table 1 and the evaluation results of the float test of Sample 1-4 are also shown in Table 2 for comparison.

TABLE 2

|  | Vinylidene fluoride polymer:alumina (mass ratio) | Area density [mg/cm$^2$] | Thickness of electrolytic solution holding layer [μm] | Separation strength between negative electrode and separator [N/m] | Capacity retention rate after 300 cycles [%] | Duration until leaked electric current is observed with float charging at 60° C. and 4.25 V [h] |
|---|---|---|---|---|---|---|
| Sample 1-4 | 1:0 | 0.15 | 3.2 | 13 | 86 | 200 |
| Sample 2-1 | 1:2 | 0.28 | 3.1 | 10 | 88 | 260 |
| Sample 2-2 | 1:4 | 0.35 | 3.3 | 8 | 89 | 313 |
| Sample 2-3 | 1:6 | 0.41 | 2.9 | 5 | 85 | 320 |
| Sample 2-4 | 1:8 | 0.45 | 3.0 | 5 | 80 | 340 |
| Sample 2-5 | 1:10 | 0.51 | 3.1 | 2 | 55 | 380 |

As shown in Table 2, with the mass ratio of the vinylidene fluoride polymer and the alumina in a range of 1:0 to 1:8, the "separation strength between the negative electrode and the separator" was 5 N/m or more, and the capacity retention rate after 300 cycles was also 80% or more, which was preferable. On the other hand, when the mass ratio of the vinylidene fluoride polymer and the alumina became 1:10, there was a tendency that the separation strength between the negative electrode and the separator also became 2 N/m, and the capacity retention rate after 300 cycles was also degraded to 55%. In addition, it could be confirmed that as the fraction of the alumina was increased in the mass ratio of the vinylidene fluoride polymer and the alumina, the duration, in which leaked electric current was observed with float charging at 60° C. and 4.25 V, was increased and the float resistance was also improved. In consideration of the above facts, a conclusion was made that, in the electrolytic solution holding layer, the inorganic particles may be added to the vinylidene fluoride polymer, and, in this case, the mass ratio of the vinylidene fluoride polymer to the inorganic particles is preferably in a range of 1:1 to 1:8, and more preferably in a range of 1:2 to 1:6.

6. Other Embodiment (An Example of Variation)

The technology is not limited to the above embodiments of the technology, and a variety of variations or applications are allowed within the scope of the gist of the technology. For example, the above embodiments and examples described batteries having the laminate film-type battery structure, batteries having a wound structure in which electrodes are wound, and stack-type batteries having a laminate structure in which electrodes are laminated, but the technology is not limited thereto. For example, the technology can also be applied to batteries and the like having electrode structures or battery structures other than the above battery structure or electrode structure. The non-aqueous electrolyte battery of the second embodiment may have a configuration in which the positive electrode lead 53 and the negative electrode lead 54 are drawn out from the same side may be employed. The non-aqueous electrolyte battery of the third embodiment may have a configuration in which the positive electrode lead 53 and the negative electrode lead 54 are drawn out from mutually facing sides. In addition, the second embodiment has a configuration in which the outermost layer of the battery element 60 forms the separator 63, but may have a configuration in which the outermost layer forms the positive electrode 61 or the negative electrode 62. In addition, the second embodiment may have a configuration in which one outermost layer of the battery element 60 forms the separator 63, and the other outermost layer forms the positive electrode 61 or the negative electrode 62. The third embodiment has a configuration in which the outermost layer of the battery element 90 forms the negative electrode 62, but may have a configuration in which the outermost layer forms the separator 63 or the positive electrode 61. In addition, the third embodiment may have a configuration in which one outermost layer of the battery element 90 forms the separator 63, and the other outermost layer forms the positive electrode 61 or the negative electrode 62. The configuration of the laminate film 52 in the second and third embodiments may be applied to the exterior member 40 in the first embodiment.

In the above second and third embodiments and the examples of variation thereof, a porous polymer compound layer may be provided between the battery element 60 and the laminate film 52. The porous polymer compound layer is configured by holding a non-aqueous electrolytic solution in a polymer material. A polymer material including vinylidene fluoride as a component is used as the polymer material. Specific examples that can be preferably used include polyvinylidene fluoride (PVdF), copolymers including vinylidene fluoride (VdF) and hexafluoropropylene (HFP) as repeating units, copolymers including vinylidene fluoride (VdF), hexafluoropropylene (HFP), and chlorotrifluoroethylene (CTFE) as repeating units, and the like.

When polyvinylidene fluoride (PVdF) is used as the polymer material that composes the porous polymer compound layer, it is preferable to use polyvinylidene fluoride having a weight average molecular weight of 500,000 or more to 1.5 million or less. This is because the effect of suppressing the movement of the battery element is high.

In addition, inorganic particles may be mixed into the porous polymer compound layer. The strength of the porous polymer compound layer is improved, and recesses and protrusions are generated on the porous polymer compound layer so that deviation between the battery element and the laminate film can be suppressed. Therefore, an increase in the internal resistance can be further suppressed.

The inorganic particles include metallic oxides, metallic nitrides, metallic carbides, and the like, all of which have electrical insulating properties. The metallic oxides that can be preferably used include alumina ($Al_2O_3$), magnesia (MgO), titania ($TiO_2$), zirconia ($ZrO_2$), silica ($SiO_2$), and the like. The metallic nitrides that can be preferably used include silicon nitride ($Si_3N_4$), aluminum nitride (AlN), boron nitride (BN), titanium nitride (TiN), and the like. The metallic carbides that can be preferably used include silicon carbide (SiC), boron carbide ($B_4C$), and the like. These inorganic particles may be used singly or in combination of two or more kinds. In addition, since the inorganic particles are excellent in terms of heat resistance and oxidation resistance, the effect of suppressing the movement of the battery element is not impaired even during an increase in the battery temperature, which is preferable.

In addition, the technology can employ the following configurations.

[1]

A non-aqueous electrolyte battery, having:

a positive electrode, a negative electrode, an insulating layer present between the positive electrode and the negative electrode, and an electrolytic solution holding layer that composes the insulating layer and includes an electrolytic solution and a porous polymer compound, in which the electrolytic solution is held in the pores in the porous polymer compound and swells the porous polymer compound, the material of the porous polymer compound includes a vinylidene fluoride polymer, the vinylidene fluoride polymer is a vinylidene fluoride homopolymer or a copolymer including vinylidene fluoride monomer unit and a hexafluoropropylene monomer unit, the mass composition ratio of the monomer units of the vinylidene fluoride polymer, or vinylidene fluoride monomer units:hexafluoropropylene monomer units, is 100:0 to 95:5, and the weight average molecular weight of the vinylidene fluoride polymer is 500,000 or more to less than 1.5 million.

[2]

The non-aqueous electrolyte battery according to [1], in which the insulating layer is composed of a porous base material layer and the electrolytic solution holding layer formed on at least one surface of the porous base material layer.

[3]
The non-aqueous electrolyte battery according to [1] or [2], in which the air permeability of the porous polymer compound is 500 seconds/100 cc or less.

[4]
The non-aqueous electrolyte battery according to [2] or [3], in which the porous base material layer includes a porous polyolefin-based resin.

[5]
The non-aqueous electrolyte battery according to any one of [1] to [4],
in which the weight average molecular weight of the vinylidene fluoride polymer is 750,000 or more to less than 1.5 million.

[6]
The non-aqueous electrolyte battery according to any one of [1] to [5],
in which the air permeability of the porous polymer compound is 300 seconds/100 cc or less.

[7]
The non-aqueous electrolyte battery according to any one of [1] to [6],
in which the electrolytic solution holding layer further includes inorganic particles, and the mass ratio of the vinylidene fluoride polymer and the inorganic particles, or mass of the vinylidene fluoride polymer:mass of the inorganic particles, is 1:1 to 1:10.

[8]
The non-aqueous electrolyte battery according to any one of [2] to [7],
in which the porous polymer compound is formed by coating a solution containing the vinylidene fluoride polymer dissolved in a first solvent composed of a polar organic solvent on a porous base material and immersing the coated porous base material in a second solvent, which is compatible with the first solvent and is a poor solvent with respect to the polymer material.

[9]
The non-aqueous electrolyte battery according to any one of [1] to [8] comprising a laminated filmed exterior body.

[10]
A method of manufacturing a non-aqueous electrolyte battery
having a process in which a solution containing a polymer material dissolved in a first solvent composed of a polar organic solvent is coated on a porous base material, the coated porous base material is immersed in a second solvent, the second solvent being compatible with the first solvent and is a poor solvent with respect to the polymer material, thereby forming a porous polymer compound on the porous base material;
a process in which an electrode body having the positive electrode, the negative electrode, and the porous base material on which the porous polymer compound is formed, in which the porous base material on which the porous polymer compound is formed being present between the positive electrode and the negative electrode, is manufactured; and
a process in which the electrode body is accommodated in an exterior body, an electrolytic solution is injected into the exterior body, and then heat pressing is carried out.
the polymer material including a vinylidene fluoride polymer, which is a vinylidene fluoride homopolymer or a copolymer including a vinylidene fluoride monomer unit and a hexafluoropropylene monomer unit,
the mass composition ratio of the monomer units of the vinylidene fluoride polymer, or vinylidene fluoride monomer units:hexafluoropropylene monomer units, is 100:0 to 95:5, and
the weight average molecular weight of the vinylidene fluoride polymer is 500,000 or more to less than 1.5 million.

[11]
The method of manufacturing a non-aqueous electrolyte battery according to [10],
in which the first solvent is N-methyl-2-pyrrolidone, γ-butyrolactone, N,N-dimethylacetamide, or N,N-dimethyl sulfoxide and
the second solvent is water, ethyl alcohol, or propyl alcohol.

[12]
An insulating material, including a porous polymer compound,
in which the porous polymer compound can hold an electrolytic solution in the pores, and can be swollen by the electrolytic solution,
the material of the porous polymer compound includes a vinylidene fluoride polymer,
the vinylidene fluoride polymer is a vinylidene fluoride homopolymer or a copolymer including a vinylidene fluoride monomer unit and a hexafluoropropylene monomer unit,
the mass composition ratio of the monomer units of the vinylidene fluoride polymer, or vinylidene fluoride monomer units:hexafluoropropylene monomer units, is 100:0 to 95:5, and
the weight average molecular weight of the vinylidene fluoride polymer is 500,000 or more to less than 1.5 million.

[13]
The insulating material according to [12], further including a porous base material having the porous polymer compound formed on at least one surface.

[14]
A method of manufacturing an insulating material including a porous polymer compound, having:
a process in which a solution containing a polymer material dissolved in a first solvent composed of a polar organic solvent is coated on a base material, the base material coated with the solution is immersed in a second solvent, which is compatible with the first solvent and is a poor solvent with respect to the polymer material, thereby forming the porous polymer compound,
in which the polymer material includes a vinylidene fluoride polymer,
the vinylidene fluoride polymer is a vinylidene fluoride homopolymer or a copolymer including a vinylidene fluoride monomer unit and a hexafluoropropylene monomer unit,
the mass composition ratio of the monomer units of the vinylidene fluoride polymer, or vinylidene fluoride monomer units:hexafluoropropylene monomer units, is 100:0 to 95:5, and
the weight average molecular weight of the vinylidene fluoride polymer is 500,000 or more to less than 1.5 million.

[15]
A battery pack, having:
the non-aqueous electrolyte battery according to any one of [1] to [9],
a controlling section that controls the non-aqueous electrolyte battery, and
an exterior that covers the non-aqueous electrolyte battery.

[16]
An electronic device having the non-aqueous electrolyte battery according to any one of [1] to [9], and receiving the supply of electric power from the non-aqueous electrolyte battery.

[17]
An electromotive vehicle, having:
the non-aqueous electrolyte battery according to any one of [1] to [9],
a converting apparatus that receives the supply of electric power from the non-aqueous electrolyte battery and converts the electric power to a driving force of the vehicle, and a control apparatus that carries out information processing concerning vehicle control based on information concerning the non-aqueous electrolyte battery.

[18]
A power storage apparatus having the non-aqueous electrolyte battery according to any one of [1] to [9], and supplying electric power to an electronic device connected to the non-aqueous electrolyte battery.

[19]
The power storage apparatus according to [18] having an electric power information control apparatus that sends and receives signals to and from other devices through a network and carrying out the charging and discharging control of the non-aqueous electrolyte battery based on information received by the electric power information control apparatus.

[20]
An electric power system which receives the supply of electric power from the non-aqueous electrolyte battery according to any one of [1] to [9] or in which electric power is supplied to the non-aqueous electrolyte battery from a power generating apparatus or an electric power network.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A non-aqueous electrolyte battery comprising:
a positive electrode,
a negative electrode,
an insulating layer present between the positive electrode and the negative electrode, and
an electrolytic solution holding layer that composes the insulating layer and includes an electrolytic solution and a porous polymer compound,
wherein the electrolytic solution is held in the pores in the porous polymer compound and swells the porous polymer compound,
the material of the porous polymer compound includes a vinylidene fluoride polymer,
the vinylidene fluoride polymer is a vinylidene fluoride homopolymer or a copolymer including vinylidene fluoride monomer unit and a hexafluoropropylene monomer unit,
the mass composition ratio of the monomer units of the vinylidene fluoride polymer, or vinylidene fluoride monomer units:hexafluoropropylene monomer units is 100:0 to 95:5, and
the average molecular weight of the vinylidene fluoride polymer is 750,000 or more to less than 1.5 million.

2. The non-aqueous electrolyte battery according to claim 1,
wherein the insulating layer is composed of a porous base material layer and the electrolytic solution holding layer formed on at least one surface of the porous base material layer.

3. The non-aqueous electrolyte battery according to claim 1,
wherein the air permeability of the porous polymer compound is 500 seconds/100 cc or less.

4. The non-aqueous electrolyte battery according to claim 2,
wherein the porous base material layer includes a porous polyolefin-based resin.

5. The non-aqueous electrolyte battery according to claim 1,
wherein the air permeability of the porous polymer compound is 300 seconds/100 cc or less.

6. The non-aqueous electrolyte battery according to claim 1,
wherein the electrolytic solution holding layer further includes inorganic particles, and the mass ratio of the vinylidene fluoride polymer and the inorganic particles, or mass of the vinylidene fluoride polymer:mass of the inorganic particles is 1:1 to 1:10.

7. The non-aqueous electrolyte battery according to claim 2,
wherein the porous polymer compound is formed by coating a solution containing the vinylidene fluoride polymer dissolved in a first solvent composed of a polar organic solvent on a porous base material and immersing the coated porous base material in a second solvent, which is compatible with the first solvent and is a poor solvent with respect to the vinylidene fluoride polymer.

8. The non-aqueous electrolyte battery according to claim 1 comprising a laminated filmed exterior body.

9. A method of manufacturing a non-aqueous electrolyte battery, the method comprising:
a step of forming a porous polymer compound on the porous base material by coating a solution containing a polymer material dissolved in a first solvent composed of a polar organic solvent on a porous base material, and immersing the coated porous base material in a second solvent, said second solvent being compatible with the first solvent and being a poor solvent with respect to the polymer material;
a step of manufacturing an electrode body having a positive electrode, a negative electrode, and the porous base material on which the porous polymer compound is formed, the porous base material on which the porous polymer compound is formed being present between the positive electrode and the negative electrode; and
a step of accommodating the electrode body in an exterior body, injecting an electrolytic solution into the exterior body, and then carrying out heat pressing,
said polymer material including a vinylidene fluoride polymer, which is a vinylidene fluoride homopolymer or a copolymer including vinylidene fluoride monomer unit and a hexafluoropropylene monomer unit,
the mass composition ratio of the monomer units of the vinylidene fluoride polymer, or vinylidene fluoride monomer units:hexafluoropropylene monomer units, is 100:0 to 95:5, and
the average molecular weight of the vinylidene fluoride polymer is 750,000 or more to less than 1.5 million.

10. The method of manufacturing a non-aqueous electrolyte battery according to claim 9,
wherein the first solvent is any one selected from a group consisting of N-methyl-2-pyrrolidone, γ-butyrolactone, N,N-dimethylacetamide, and N,N-dimethyl sulfoxide and
the second solvent is any one selected from a group consisting of water, ethyl alcohol, and propyl alcohol.

11. An insulating material comprising:
a porous polymer compound,
wherein the porous polymer compound can hold an electrolytic solution in pores, and can be swollen by the electrolytic solution,
the material of the porous polymer compound includes a vinylidene fluoride polymer,
the vinylidene fluoride polymer is a vinylidene fluoride homopolymer or a copolymer including a vinylidene fluoride monomer unit and a hexafluoropropylene monomer unit,
the mass composition ratio of the monomer units of the vinylidene fluoride polymer, or vinylidene fluoride monomer units:hexafluoropropylene monomer units, is 100:0 to 95:5, and
the average molecular weight of the vinylidene fluoride polymer is 750,000 or more to less than 1.5 million.

12. The insulating material according to claim 11 further comprising:
a porous base material having the porous polymer compound formed on at least one surface.

13. A method of manufacturing an insulating material including a porous polymer compound, the method comprising:
a step of forming the porous polymer compound by coating a solution containing a polymer material dissolved in a first solvent composed of a polar organic solvent on a base material, and immersing the coated base material in a second solvent, said second solvent being compatible with the first solvent and being a poor solvent with respect to the polymer material,
wherein the polymer material includes a vinylidene fluoride polymer,
the vinylidene fluoride polymer is a vinylidene fluoride homopolymer or a copolymer including a vinylidene fluoride monomer unit and a hexafluoropropylene monomer unit,
the mass composition ratio of the monomer units of the vinylidene fluoride polymer, or vinylidene fluoride monomer units:hexafluoropropylene monomer units, is 100:0 to 95:5, and
the average molecular weight of the vinylidene fluoride polymer is 750,000 or more to less than 1.5 million.

14. A battery pack comprising:
non-aqueous electrolyte battery according to claim 1;
a controlling section that controls the non-aqueous electrolyte battery; and
an exterior that covers the non-aqueous electrolyte battery.

15. An electronic device comprising:
non-aqueous electrolyte battery according to claim 1,
wherein electric power is supplied from the non-aqueous electrolyte battery.

16. An electromotive vehicle comprising:
non-aqueous electrolyte battery according to claim 1;
a converting apparatus that receives the supply of electric power from the non-aqueous electrolyte battery and converts the electric power to a driving force of the electromotive vehicle; and
a control apparatus that carries out information processing concerning a vehicle control based on information concerning the non-aqueous electrolyte battery.

17. A power storage apparatus comprising:
non-aqueous electrolyte battery according to claim 1,
wherein electric power is supplied to an electronic device connected to the non-aqueous electrolyte battery.

18. The power storage apparatus according to claim 17 further comprising:
an electric power information control apparatus that sends and receives signals to and from other devices through a network,
wherein the charging and discharging control of the non-aqueous electrolyte battery is carried out based on information received by the electric power information control apparatus.

19. An electric power system,
wherein electric power is supplied from the non-aqueous electrolyte battery according to claim 1 or electric power is supplied to the non-aqueous electrolyte battery from a power generating apparatus or an electric power network.

* * * * *